United States Patent
Moritz et al.

(10) Patent No.: US 8,266,027 B2
(45) Date of Patent: Sep. 11, 2012

(54) INFERRING ENVIRONMENTAL KNOWLEDGE THROUGH NEAR FIELD COMMUNICATION AND DATA MINING

(75) Inventors: Simon Moritz, Solna (SE); Tony Larsson, Upplands Väsby (SE); Martin Svensson, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 432 days.

(21) Appl. No.: 12/022,661

(22) Filed: Jan. 30, 2008

(65) Prior Publication Data

US 2009/0192872 A1 Jul. 30, 2009

(51) Int. Cl.
*G06Q 40/00* (2012.01)

(52) U.S. Cl. .......... 705/35; 705/2; 705/14; 709/227; 713/201; 235/385; 340/539.1; 455/445

(58) Field of Classification Search ........... 705/2, 14; 709/227; 713/201; 707/200; 235/385; 340/539.1; 455/445

See application file for complete search history.

(56) References Cited

U.S. PATENT DOCUMENTS

| | | | | |
|---|---|---|---|---|
| 5,884,322 A * | 3/1999 | Sidhu et al. | | 707/200 |
| 2003/0220835 A1* | 11/2003 | Barnes, Jr. | | 705/14 |
| 2004/0144842 A1* | 7/2004 | Brignone et al. | | 235/385 |
| 2004/0193918 A1* | 9/2004 | Green et al. | | 713/201 |
| 2006/0071778 A1* | 4/2006 | Vesikivi et al. | | 340/539.1 |
| 2006/0202803 A1 | 9/2006 | Yoon et al. | | |
| 2007/0011334 A1* | 1/2007 | Higgins et al. | | 709/227 |
| 2008/0042840 A1 | 2/2008 | Christopher | | |
| 2009/0048866 A1* | 2/2009 | Mahesh et al. | | 705/2 |
| 2009/0061884 A1* | 3/2009 | Rajan et al. | | 455/445 |

FOREIGN PATENT DOCUMENTS

| | | |
|---|---|---|
| EP | 1244043 A2 | 9/2002 |
| EP | 1564679 A2 | 8/2005 |
| WO | WO 2006/035315 A1 | 4/2006 |

OTHER PUBLICATIONS

Written Opinion and International Search Report dated May 6, 2009, issued in corresponding International Application No. PCT/SE2009/050063, 17 pages.

* cited by examiner

*Primary Examiner* — Mary Cheung
*Assistant Examiner* — Sanjeev Malhotra
(74) *Attorney, Agent, or Firm* — Myers Bigel Sibley & Sajovec, P.A.

(57) ABSTRACT

A method, performed by a mobile device, may include receiving transponder information relating to a consumer product, and verifying whether user consent exists to forward the transponder information to a network device for data mining processing. The method may further include transmitting the transponder information to the network device, when user consent exists.

6 Claims, 20 Drawing Sheets

64-BIT SGTIN FORMAT 300

| | HEADER 305 | FILTER VALUE 310 | COMPANY PREFIX INDEX 315 | ITEM REFERENCE 320 | SERIAL NUMBER 325 |
|---|---|---|---|---|---|
| | 2 BITS | 3 BITS | 14 BITS | 20 BITS | 25 BITS |
| BIT CAPACITY 330 | 2 (decimal value) | 8 | 16,383 | 9-1,048,575 | 33,554,431 |
| DECIMAL CAPACITY 335 | | | | | |

PRIOR ART

Fig. 3

96-BIT SGTIN SCHEME

| HEADER 405 | FILTER VALUE 410 | PARTITION 415 | COMPANY PREFIX 420 | ITEM REFERENCE 425 | SERIAL NUMBER 430 |
|---|---|---|---|---|---|
| 8 BITS | 3 BITS | 3 BITS | 20-40 BITS | 24-40 BITS | 38 BITS |
| 48 (decimal value) | 8 | 8 | 999,999 – 999,999,999,999 | 9,999,999 - 9 | 274,877,906,943 |

| BIT CAPACITY 435 |
| DECIMAL CAPACITY 440 |

PRIOR ART

INFERRING ENVIRONMENTAL KNOWLEDGE THROUGH NEAR FIELD COMMUNICATION AND DATA MINING

TECHNICAL FIELD

The concepts described herein may relate to a communication system, and, more particularly, to inferring environmental knowledge for a communication system through data mining.

BACKGROUND

Retail stores have used different technologies to identify products, the most notable technology being bar codes. However, there are other technologies available, such as radio frequency identification (RFID). Although both bar codes and RFID may be used to identify products, RFID does not require direct contact or line-of-sight scanning.

FIG. 1 is a diagram of a conventional RFID system 100. For example, RFID system 100 may include a reader 105, a reader antenna 110, and a transponder 115 (sometimes referred to as a "tag"). Transponder 115 may include a microchip 120 (e.g., made of silicon) attached to a transponder antenna 125. Microchip 120 may be embedded in transponder 115 and may be as small as a half a millimeter square. Transponder 115 may include an identifier (e.g., a serial number) that is capable of being transmitted up to a distance of several meters. Some transponders (e.g., a passive RFID transponder) may not include an internal power source. Rather, a passive transponder may acquire power (e.g., through induction) from a radio signal 130 transmitted by reader 105. In such instances, transponder 115 may transmit its identifier in a radio signal 135 back to reader 105 based on radio signal 130.

RFID technology may be applied to almost any physical object (e.g., a human being, an animal, or a consumer product). Given the expansive nature of this technology, some companies have been motivated to provide certain standards. For example, EPCglobal is a working group that has developed industry standards for the Electronic Product Code (EPC) based on RFID technology. FIG. 2 is a diagram illustrating a conventional EPCglobal standard format for EPCs. As illustrated, an exemplary EPC 200 may include a header 205, an EPC manager number 210, an object class 215, and a serial number 220. Header 205 and EPC manager number 210 may be fields of EPC 200 that are assigned by EPCglobal, while object class 215 and serial number 220 may be fields of EPC 200 that are assigned by an EPC manager number owner (e.g., a company).

Header 205 may identify the structure (e.g., a length, a type, a version, and/or a generation) of EPC 200. EPC manager number 210 may identify an entity (e.g., a company) responsible for maintaining the subsequent fields (i.e., object class 215 and serial number 220). In other words, EPC manager number 210 may identify the company responsible for the product or thing associated with EPC 200. Object class 215 may identify a class of objects (e.g., a category or a type of thing, similar to a stock keeping unit (SKU)). Serial number 220 may identify an instance of the class (e.g., a specific object within the category).

EPC 200 may be based on different formats. For example, EPC 200 may be based on a 64-bit format or a 96-bit format. FIG. 3 is a diagram of a conventional 64-bit serialized global trade identification number (SGTIN) format 300. As illustrated, 64-bit SGTIN format 300 may include a variety of fields, such as a header 305, a filter value 310, a company prefix index 315, an item reference 320, and a serial number 325.

Header 305 may identify the structure of the EPC. For example, header 305 may indicate that the tag data is encoded according to 64-bit SGTIN format 300. Filter value 310 may be used for filtering and pre-selection of basic logistics types, such as items, cases, and pallets. Company prefix index 315 may be used as an index for table look-up (e.g., an offset into a company prefix index table) for a company prefix registered to EPCglobal. Item reference 320 may identify a category or a type of an item. Serial number 325 may indicate a particular item of item reference 320.

For description purposes only, FIG. 3 also illustrates a bit capacity 330 and a decimal capacity 335. Bit capacity 330 may indicate a number of bits associated with each field described above. As illustrated, header 305 may be 2 bits long, filter value 310 may be 3 bits long, company prefix index 315 may be 14 bits long, item reference 320 may be 20 bits long, and serial number 325 may be 25 bits long. Similarly, decimal capacity 335 may indicate a corresponding base-ten numeric capacity. Header 305 may contain a specific value where a decimal capacity is inapplicable (e.g., 10 (base-two) or 2 (base-ten)). Additionally, the decimal capacity for item reference 320 depends on a length of company prefix index 315. Hence, the decimal capacity for item reference 320 is illustrated as a range of decimal values.

FIG. 4 is a diagram of a conventional 96-bit SGTIN format 400. As illustrated, 96-bit SGTIN format 400 may include a variety of fields, such as a header 405, a filter value 410, a partition 415, a company prefix 420, an item reference 425, and a serial number 430.

Header 405 may indicate the structure of the EPC. For example, header 405 may indicate that tag data is encoded according to a 96-bit SGTIN format 400. Filter value 410 may be used for filtering and pre-selection of basic logistics types, such as items, cases, and pallets. Partition 415 may indicate how subsequent fields are divided so as to obtain the correct data for each. That is, partition 415 may indicate company prefix 420 and item reference 425 bit-structures. Company prefix 420 may include the company's European Article Numbering-Uniform Code Council (EAN.UCC) company prefix number. Item reference 425 may include the item's GTIN item reference number. Serial number 430 may include the item's unique serial number.

For description purposes only, FIG. 4 also illustrates a bit capacity 435 and a decimal capacity 440. Bit capacity 435 may indicate a number of bits associated with each field described above. As illustrated, header 405 may be 8 bits long, filter value 410 may be 3 bits long, partition 415 may be 3 bits long, company prefix 420 may be 20-40 bits long, item reference 425 may be 24-40 bits long, and serial number 430 may be 38 bits long. Similarly, decimal capacity 440 may indicate a corresponding base-ten numeric capacity. Header 405 may contain a specific value where a decimal capacity is inapplicable (e.g., 0011 0000 (base-two) or 48 (base-ten)). Additionally, the decimal value for company prefix 420 and item reference 425 may depend on the content of partition 415. Hence, the decimal capacity for company prefix 420 and item reference 425 are illustrated as ranges.

FIG. 5 is a diagram of a portion of a conventional EPC 96-bit SGTIN tag 500 in human-readable form. For example, filter value 410 may have a value of "3" that indicates the item is a single shipping/consumer trade item 505. Company prefix 420 may have a value of "0037000" that indicates the company as Company XYZ 510. Item reference 425 may have a value of "06542" that indicates the item is Paper Towels—15 Pack 515, and serial number 430 may have a value of "773346595" that provides a unique serial number for item 520.

While FIGS. 3-5 have illustrated a SGTIN scheme, other schemes, formats, industrial bar code standards and/or identifiers may be additionally and/or alternatively used (e.g., Serial Shipping Container Code (SSCC), Global Location Number (GLN), Global Individual Asset Identifier (GIAI), GS1 EAN.UCC 128, Transfer Syntax, Health Industry Bar Code (HIBC), Automotive Industry Action Group (AIAG), etc.). Additionally, or alternatively, while RFID has been described, other NFC may be used, such as Bluetooth, Wireless Universal Serial Bus (WUSB), Ultra Wide Band (UWB), etc.

Another area related to communications is data mining. Generally, data mining (sometimes referred to as data discovery or knowledge discovery) is the process of analyzing data from different perspectives and summarizing it into useful information. For example, the information may be used to discover hidden information to increase revenue, cut costs, make services more personalized, etc.

Data mining tools may be employed to predict future trends and behaviors that allow businesses to make proactive, knowledge-driven decisions. In some cases, a data mining tool may automatically answer business questions that traditionally were too time-consuming to resolve. In this regard, patterns or predictive information stemming from these data mining models provide businesses with an indispensable asset that otherwise would have been previously missed by alternate methods.

Thus, data mining may be defined as an automated extraction of predictive information from (large) databases. Consequently, there are two keywords, namely, automated and predictive. That is, data mining models may include algorithms that find patterns, relations, profiles, classifications, etc., in an automated fashion, which provide results that can be used to predict the future with some degree of certainty.

Nevertheless, there are some drawbacks to NFC and data mining products and applications. For example, data mining applications do not take advantage of an information flow from, for example, NFC systems, that may describe an environment or surroundings of a user and may add context.

SUMMARY

It is an object to obviate at least some of the above disadvantages and to improve data collection to provide new services and applications.

According to one aspect, a method may include receiving, by a mobile device, transponder information relating to a consumer product, verifying, by the mobile device, whether user consent exists to forward the transponder information to an operator's network device for data mining purposes, and transmitting, by the mobile device, the transponder information to the operator's network device when user consent exists.

According to another aspect, a method may include receiving radio frequency near field communication information from a mobile device, generating environmental data that includes surroundings of a user based on the RFID information, generating, by a data mining engine, predictive data based on the environmental data, and providing a service to the user based on the predictive data.

According to yet another aspect, a mobile device may include a memory to store instructions and a processor to execute the instructions. The processor may execute the instructions to receive one or more product identifiers from one or more near field communication transponders, provide a timestamp for each of the one or more product identifiers, determine whether user consent exists for transmitting the one or more product identifiers to a network, and transmit the one or more product identifiers for data mining purposes to the network if user consent exists.

According to still another aspect, a computer-readable medium may contain instructions executable by a data mining engine within a network, the computer-readable medium may include one or more instructions for generating environmental data based on a distance setting that includes at least one of a product near a user or a product more distant from the user, the environmental data being based on product identifier information collected from a user terminal, and one or more instructions for generating inferred knowledge based on the environmental data.

According to yet another aspect, a service provider network may include a data mining engine to generate predictive data based on context data collected from a subscriber via a mobile terminal associated with the subscriber, where the context data includes tag information associated with products in a locale of the subscriber, and a transceiver to provide recommendation data to the subscriber based on the predictive data.

As a result of the foregoing, NFC may be employed to enhance data mining and provide new applications and services to users, network operators, and third parties. As will be described below, among other things, a user may collect environmental information via his/her terminal that may be combined with other information, such as network traffic data, information associated with other users, etc., to develop inferred information.

BRIEF DESCRIPTION OF THE DRAWINGS

FIG. 3 is a diagram illustrating a conventional 64-bit SGTIN format;

FIG. 4 is a diagram illustrating a conventional 96-bit SGTIN format;

DETAILED DESCRIPTION

The following detailed description refers to the accompanying drawings. The same reference numbers in different drawings may identify the same or similar elements. Also, the following description does not limit the invention. The term "component," as used herein, is intended to be broadly interpreted to include software, hardware, or a combination of hardware and software.

Figure 1:
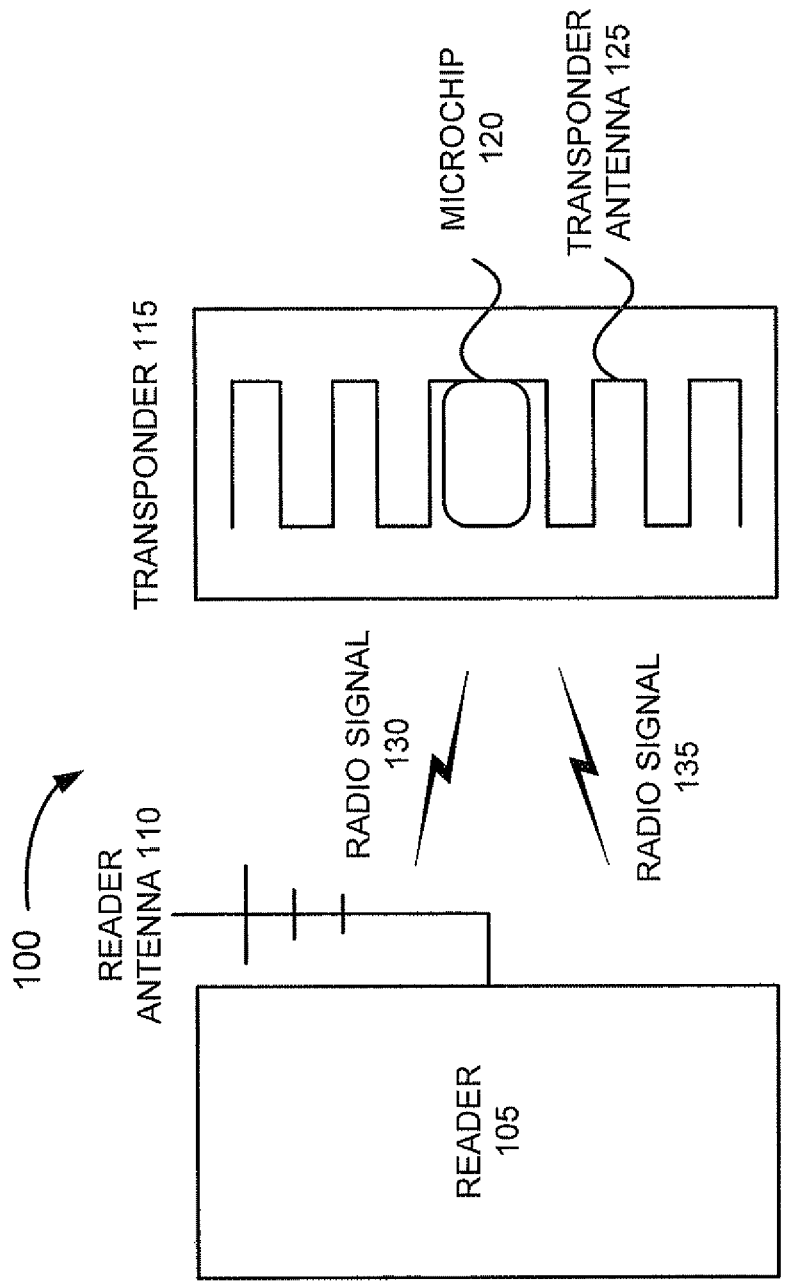
FIG. 1 is a diagram illustrating a conventional RFID system.
Figure 2:
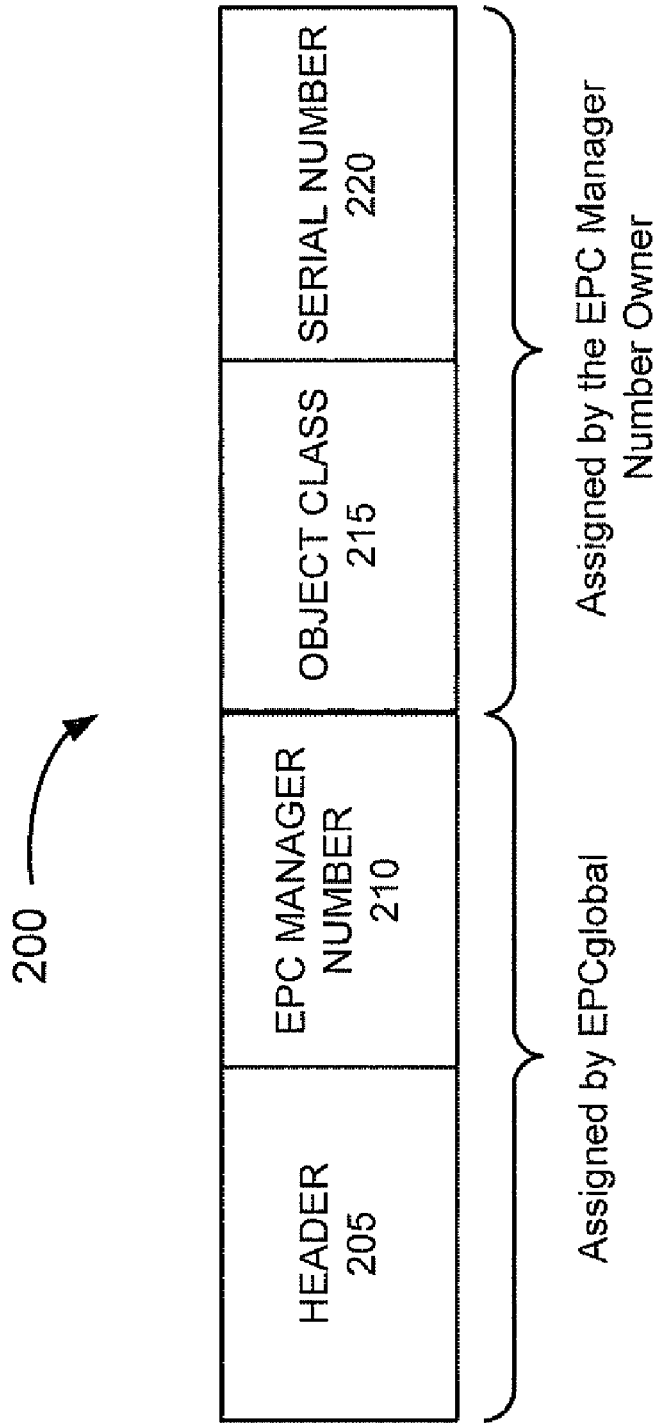
FIG. 2 is a diagram illustrating a conventional format for EPCs.
Figure 5:
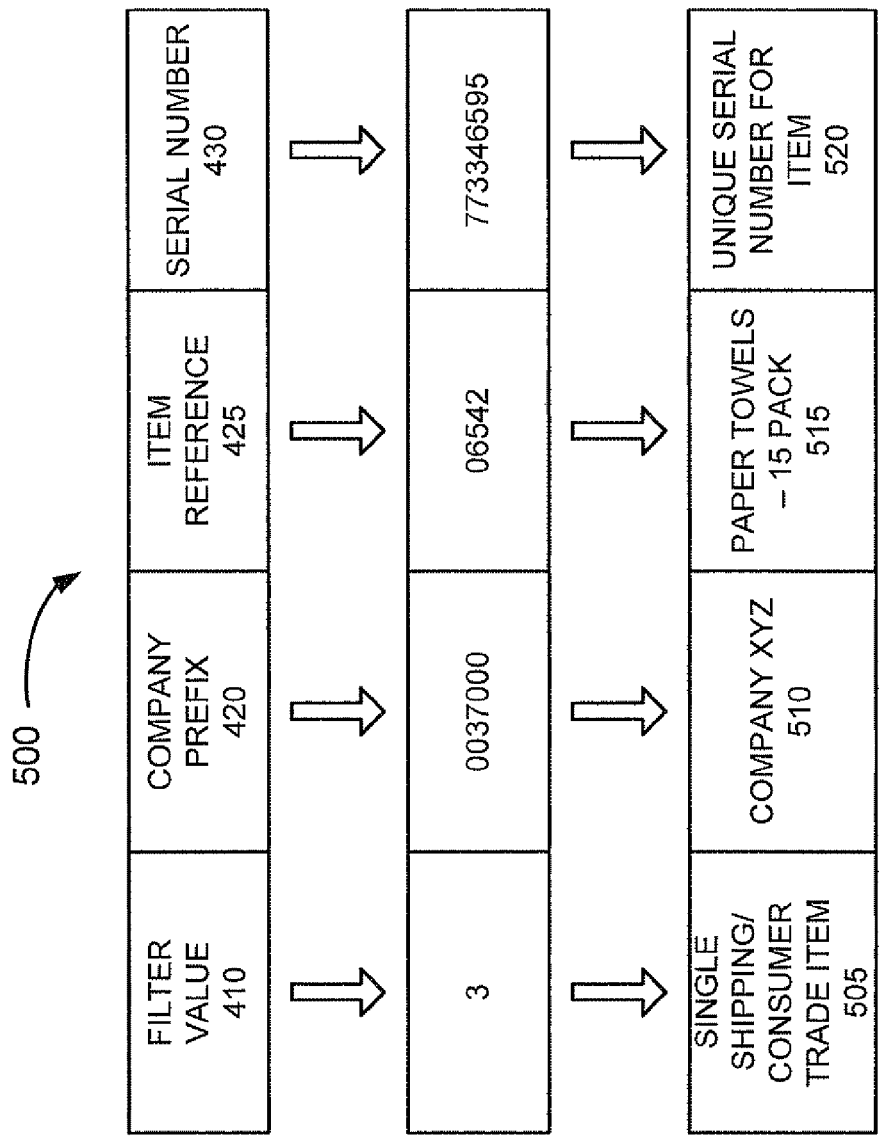
FIG. 5 is a diagram illustrating a portion of a conventional 96-bit SGTIN format in human-readable form.
Figure 6:
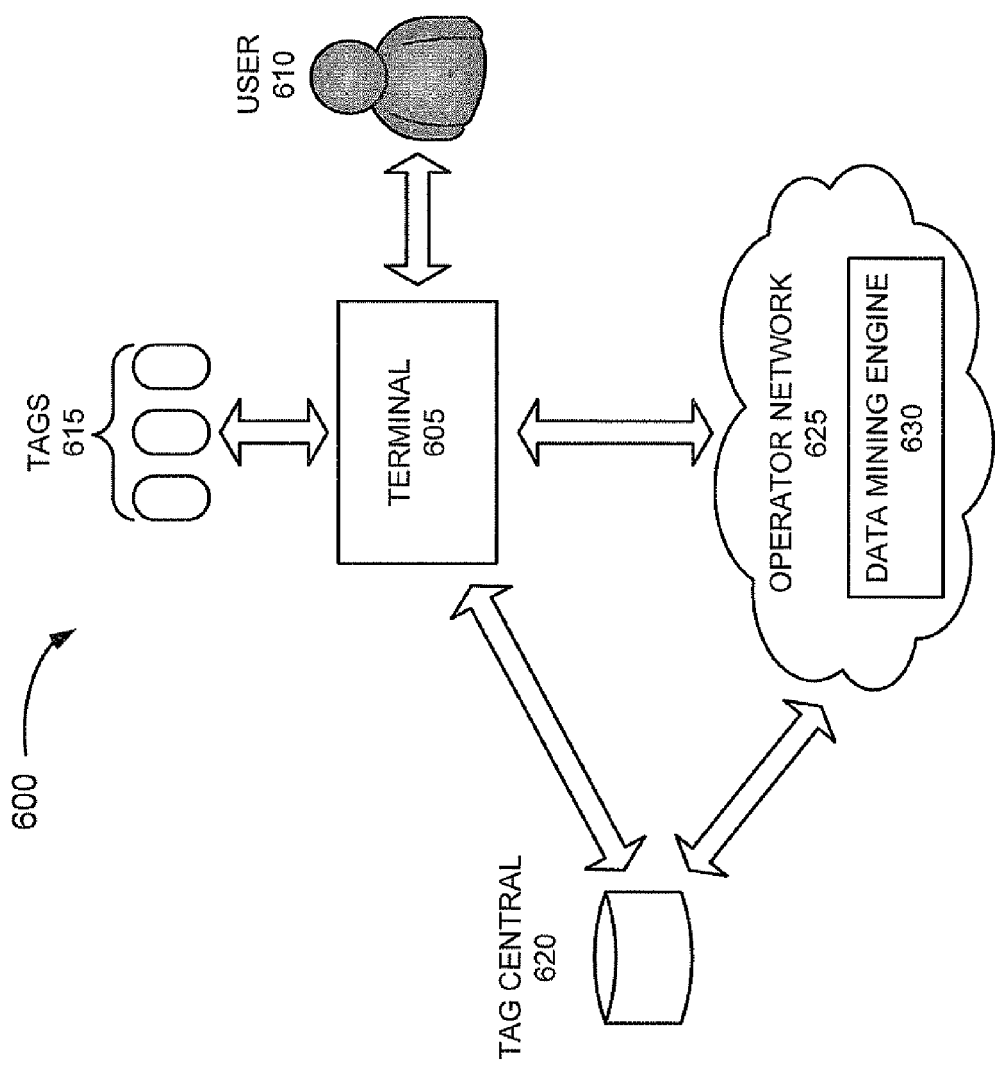
FIG. 6 is a diagram illustrating an exemplary network that may be associated with the concepts described herein.

FIG. 6 is a diagram illustrating an exemplary network 600. As illustrated, network 600 may include a terminal 605, one or more tags 615, a tag central 620, and an operator network 625 that includes a data mining engine 630. A user 610 may operate terminal 605.

Terminal 605 may include a mobile or a portable device capable of receiving radio frequency (RF) signals. As will be described below, terminal 605 may include a NFC transponder. For example, the NFC transponder may include an RFID transponder. Terminal 605 may include, for example, a mobile telephone, a personal digital assistant (PDA), a handheld computer, or some other kind of communication device.

Tags 615 may include an RF transponder. For example, the RF transponder may include an RFID transponder. The RFID transponder may be passive, active, or semi-active. Tags 615 may operate, for example, in a low frequency (LF) band, a high frequency (HF) band, an ultra-high frequency (UHF) band, and/or a higher ultra high frequency (HUHF) band.

Tag central 620 may include one or more devices capable of storing data (e.g., tag data). As will be described below, the data may include, for example, tag identification information (e.g., a serial number), a type of tag, inferred knowledge, user preferences, and/or data mining data, etc. As illustrated, terminal 605 and operator network 625 may be capable of communicating with tag central 620. Tag central 620 may be implemented as a single device or in a distributed fashion. Additionally, or alternatively, tag central 620 may be located as a backend component (e.g., as part of the Internet and/or operator network 625) and/or located in stores, etc. Depending on where tag central 620 is located, terminal 605 may communicate with tag central 620 via, for example, an operator's portal or via a Bluetooth "lighthouse" (e.g., a stationary Bluetooth central that collects information, etc.).

Operator network 625 may include, for example, the Internet, an intranet, a local area network (LAN), a wide area network (WAN), a wireless network, a telephone network, any other type of network, and/or a combination of networks.

Data mining engine 630 may include one or more components for performing data mining operations. For example, data mining engine 630 may include one or more algorithms for finding patterns, relations, profiles, and/or classifications, within data, in an automated fashion. Data mining engine 630 may also provide forecasting or predictive modeling. For example, data mining engine 630 may predict or forecast based on regression techniques, clustering, nearest neighbor, decision trees (e.g., classification and regression trees (CART) or chi-square automatic interaction detector (CHAID)), and/or neural network architectures.

As will be described further below, data mining engine 630 may provide inferred knowledge (i.e., knowledge with a conclusion) to user 610 via terminal 605 based on data collected from terminal 605, tags 615, tag central 620, and/or other data sources (e.g., operator network traffic, the Internet, etc.). Additionally, operator network 625 may be provided with inferred knowledge from data mining engine 630.

Although FIG. 6 illustrates an exemplary network 600, in other implementations, fewer, additional, or different devices may be employed. For example, in other implementations, network 600 may not include tag central 620. Additionally, or alternatively, one or more devices of network 600 may perform one or more functions described as being performed by one or more other devices of network 600.

Figure 7:
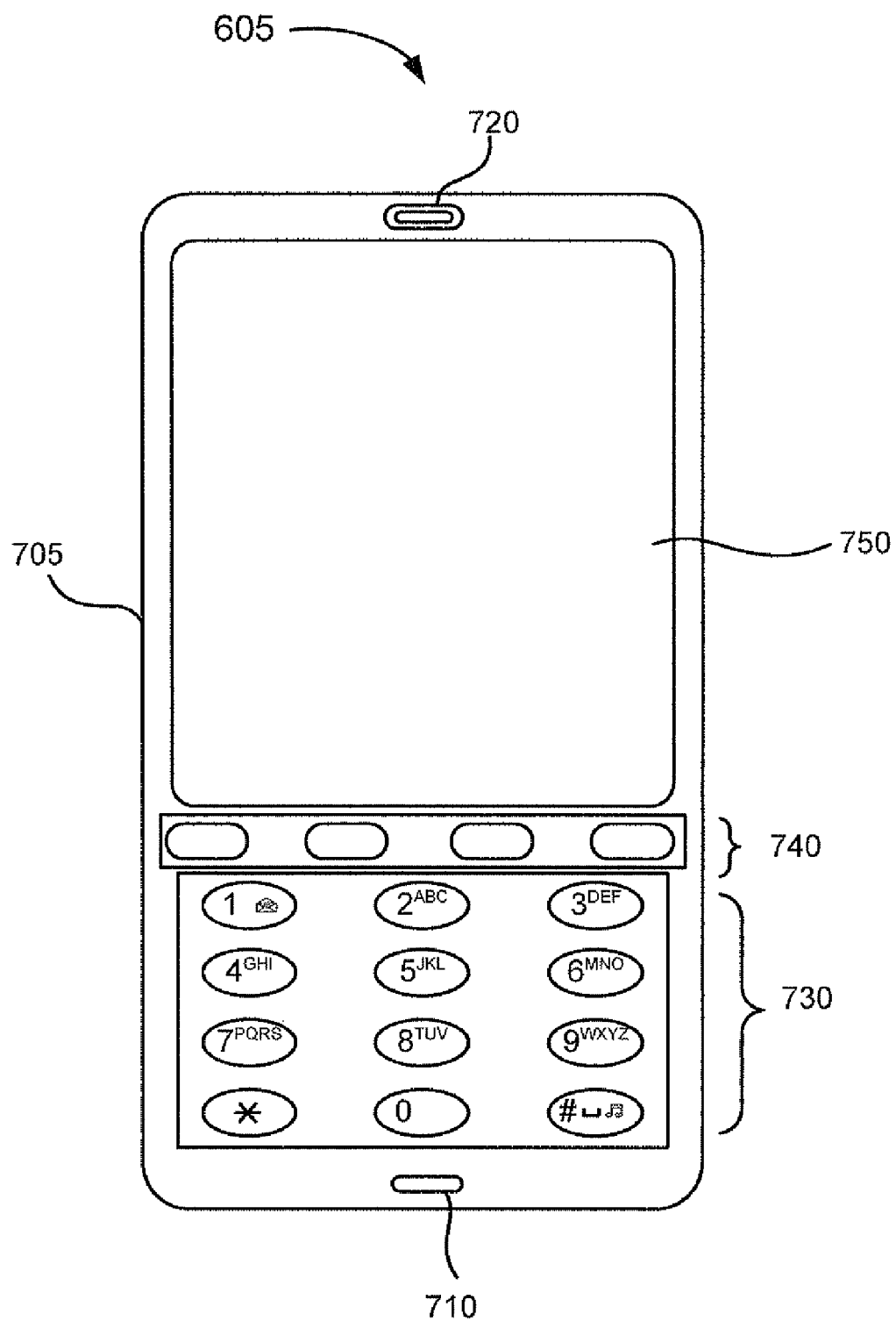
FIG. 7 is a diagram illustrating a frontal view of exemplary external components of an exemplary terminal of the network depicted in FIG. 6.

FIG. 7 is a diagram illustrating a front view of exemplary external components of terminal 605. As illustrated, terminal 605 may include a housing 705, a microphone 710, a speaker 720, a keypad 730, function keys 740, and a display 750.

Housing 705 may include a structure configured to contain components of terminal 605. For example, housing 705 may be formed from metal or plastic and may be configured to support microphone 710, speaker 720, keypad 730, function keys 740, and display 750.

Microphone 710 may include any component capable of transducing air pressure waves to a corresponding electrical signal. For example, a user may speak into microphone 710 during a telephone call. Speaker 720 may include any component capable of transducing an electrical signal to a corresponding sound wave. For example, a user may listen to music or hear a person's voice during a telephone call through speaker 720.

Keypad 730 may include any component capable of providing input to terminal 605. Keypad 730 may include a standard telephone keypad. Keypad 730 may also include one or more special purpose keys. In one implementation, each key of keypad 730 may be, for example, a pushbutton. A user may utilize keypad 730 for entering information, such as text or a phone number, or activating a special function.

Function keys 740 may include any component capable of providing input to terminal 605. Function keys 740 may include a key that permits a user to cause terminal 605 to perform one or more operations. The functionality associated with a key of function keys 740 may change depending on a mode of terminal 605. For example, function keys 740 may perform a variety of operations, such as placing a telephone call, playing various media, sending e-mail, setting various camera features (e.g., focus, zoom, etc.), accessing the Web, and/or accessing an application. Function keys 740 may include a key that provides a cursor function and a select function. In one implementation, each key of function keys 740 may be, for example, a button.

Display 750 may include any component capable of providing visual information. For example, in one implementation, display 750 may be a liquid crystal display (LCD). In other implementations, display 750 may be any one of other display technologies, such as a plasma display panel (PDP), a field emission display (FED), a thin film transistor (TFT) display, etc. Display 750 may be utilized to display, for example, text, image, and/or video information.

Terminal 605 is intended to be broadly interpreted to include any type of mobile or portable communication device. Accordingly, although FIG. 7 illustrates exemplary external components of terminal 605, in other implementations, terminal 605 may contain fewer, different, or additional external components than the external components depicted in FIG. 7. For example, terminal 605 may include a camera or have image capturing capabilities. Additionally, or alternatively, one or more external components of terminal 605 may include the capabilities of one or more other external components of terminal 605. For example, display 750 may be an input component (e.g., a touch screen) and/or keypad 730 may be icons on display 750. Additionally, or alternatively, the external components may be arranged differently than the external components depicted in FIG. 7.

Figure 8:
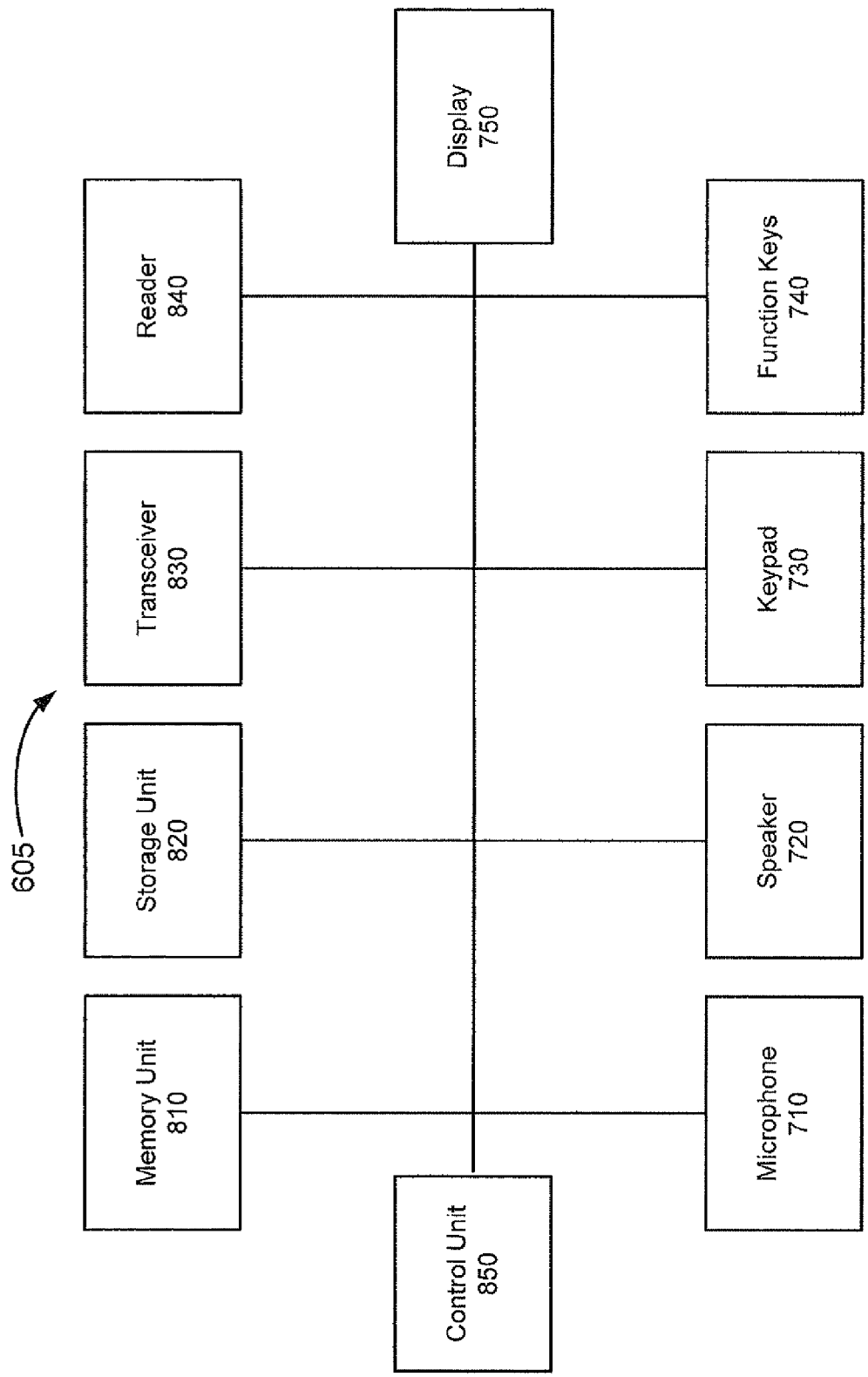
FIG. 8 is a diagram illustrating exemplary internal components of the exemplary terminal of the network depicted in FIG. 6.

FIG. 8 is a diagram illustrating exemplary internal components of terminal 605. As illustrated, terminal 605 may include microphone 710, speaker 720, keypad 730, function keys 740, display 750, a memory unit 810, a storage unit 820, a transceiver 830, a reader 840, and a control unit 850. Microphone 710, speaker 720, keypad 730, function keys 740, and display 750 may include the features described above in connection with FIG. 7.

Memory unit 810 may include any type of component that stores data and instructions related to the operation and use of terminal 605. For example, memory unit 810 may include a storing component, such as a random access memory (RAM), a dynamic random access memory (DRAM), a static random access memory (SRAM), a read only memory (ROM), a programmable read only memory (PROM), and/or a flash memory.

Storage unit 820 may include any type of component that stores applications. For example, storage unit 820 may include a hard disk (e.g., a magnetic disk, an optical disk, a magneto-optic disk, etc.) or another type of computer-readable medium, along with a corresponding drive. The applications stored on storage unit 820 may include for example, a phonebook, an address book, a digital audio player (DAP), a digital media player (DMP), an organizer, a text messenger, a Web browser, a GPS, graphical user interface (GUI), a calendar, games, and/or a NFC application. The NFC application will be described below with respect to FIG. 9.

Memory unit 810 and/or storage unit 820 may also include a storing component external to and/or removable from terminal 605, such as a Universal Serial Bus (USB) memory stick, a Subscriber Identity Module (SIM), etc.

Transceiver 830 may include any transceiver-like mechanism that enables terminal 605 to communicate with other devices and/or systems, such as tags 615, tag central 620 and/or operator network 625. For example, transceiver 830 may include a radio interface that enables to terminal 605 to communicate in a wireless fashion. The radio interface may support one or more frequency bands for communicating with other devices and/or systems.

Transceiver 830 may implement industry promulgated protocol standards, such as Transmission Control Protocol/Internet Protocol (TCP/IP), Hypertext Transfer Protocol (HTTP), Internet Relay Chat Protocol (IRCP), Real Time Transport Protocol (RTP), Institute of Electrical and Electronics Engineers (IEEE) 802.X protocols, Bluetooth, UWB, WUSB, Global System for Mobile communications (GSM)/Universal Mobile Telecommunications System (UMTS), High-Speed Packet Access (HSPA), Code Division Multiple Access (CDMA), Long Term Evolution (LTE), IP Multimedia Subsystem (IMS), etc. Additionally, or alternatively, transceiver 830 may implement non-standard, proprietary, and/or customized protocols.

Reader 840 may include a component that collects data based on NFC with, for example, tags 615. In one implementation, reader 840 may collect data based on a particular distance restriction. For example, a standard called MyFair provides that a reader may not collect tag data from a distance greater than 10 cm. In other standards, a reader may not include a restriction in reading range, but may collect any tag data that is received. Additionally, or alternatively, in other implementations, a reader may collect tag data from one or more reading ranges. In this regard, reader 840 may employ one or more standards for collecting data based on NFC.

As will be described further below, terminal 605 may collect data associated with the environment or the surroundings of user 610. The environmental data may be provided to tag central 620 and/or data mining engine 630 of operator network 625. For example, reader 840 may collect tag data that could describe what product user 610 may be looking at (e.g., based on a close reading range) and/or the surrounding environment in which user 610 may be situated (e.g., based on a more distant reading range). In this way, based on the environmental data, operator network 625 may provide new applications and/or services to user 610 via terminal 605.

Control unit 850 may include a component that interprets and executes instructions to control the overall operation of terminal 605. Control unit 850 may include, for example, a general-purpose processor, a microprocessor, a data processor, a co-processor, a network processor, an application specific integrated circuit (ASIC), a controller, a programmable logic device, a chipset, and/or a field programmable gate array (FPGA). Control unit 850 may access instructions from memory 810, from other components of terminal 605, and/or from a source external to terminal 605 (e.g., a network or another device).

Control unit 850 may provide for a single operational mode associated with terminal 605. Additionally, or alternatively, control unit 850 may provide for multiple operational modes associated with terminal 605, which may operate simultaneously. For example, control unit 850 may simultaneously operate in more than one of a music playing mode, a radio mode (e.g., amplitude modulation/frequency modulation (AM/FM)), a telephone mode, or a reader mode (corresponding to reader 840).

As will be described in detail below, terminal 605 may perform certain operations relating to the system described herein. Terminal 605 may perform these operations in response to control unit 850 executing software instructions contained on a computer-readable medium, such as memory unit 810. A computer-readable medium may be defined as a physical or a logical memory device.

The software instructions may be read into memory unit 810 from another computer-readable medium or from another device via transceiver 830. The software instructions contained in memory unit 810 may cause control unit 850 to perform processes that will be described later. Alternatively, hardwired circuitry may be used in place of or in combination with software instructions to implement processes described herein. Thus, implementations described herein are not limited to any specific combination of hardware circuitry and software.

Although, FIG. 8 illustrates exemplary components of terminal 605, in other implementations, terminal 605 may include fewer, additional, and/or different components than those depicted in FIG. 8. Additionally, or alternatively, one or more components of terminal 605 may perform one or more other tasks described as being performed by one or more other components of terminal 605.

Figure 9:
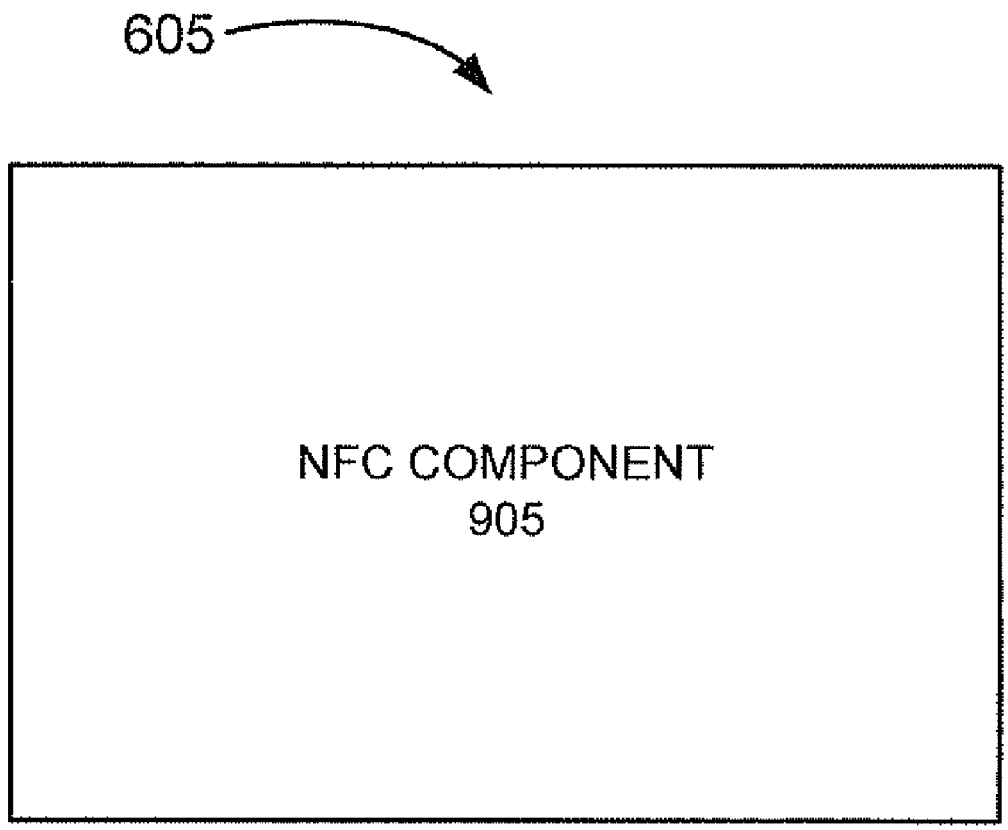
FIG. 9 is a diagram illustrating an exemplary NFC component of the exemplary terminal depicted in FIG. 6.

FIG. 9 is a diagram illustrating an exemplary NFC component 905 of terminal 605. NFC component 905 may perform one or more operations as will be described in process 1100. For example, NFC component 905 may perform one or more of the functions associated with block 1106, and/or one or more of the functions associated with block 1108 through block 1138. NFC component 905 may perform one or more these operations in conjunction with, among others, transceiver 830 and/or reader 840. NFC component 905 may be implemented with hardware, software, or a combination of hardware and software. For example, in a hardware implementation, NFC component 905 may include a control unit (e.g., a processor or an ASIC).

NFC component 905 may provide a graphical user interface (GUI) for managing data, user preferences (e.g., types of products for reader 840 to ignore, storing information associated with home or office items having tags), a reader mode (e.g., on/off settings, reading range settings associated with transceiver 830 and/or reader 840, alerts associated with particular items or EPCs, threshold values for logging in tag_IDs on terminal 605, threshold values for forwarding data to operator network 625) etc., on terminal 605.

Although FIG. 9 illustrates an exemplary NFC component 905, in other implementations, NFC component 905 may perform fewer, additional, or different operations than those operations to be described below with respect to process 1100. Additionally, or alternatively, one or more devices of network 600 may perform one or more functions described as being performed by NFC component 905 and/or terminal 605.

Figure 10:
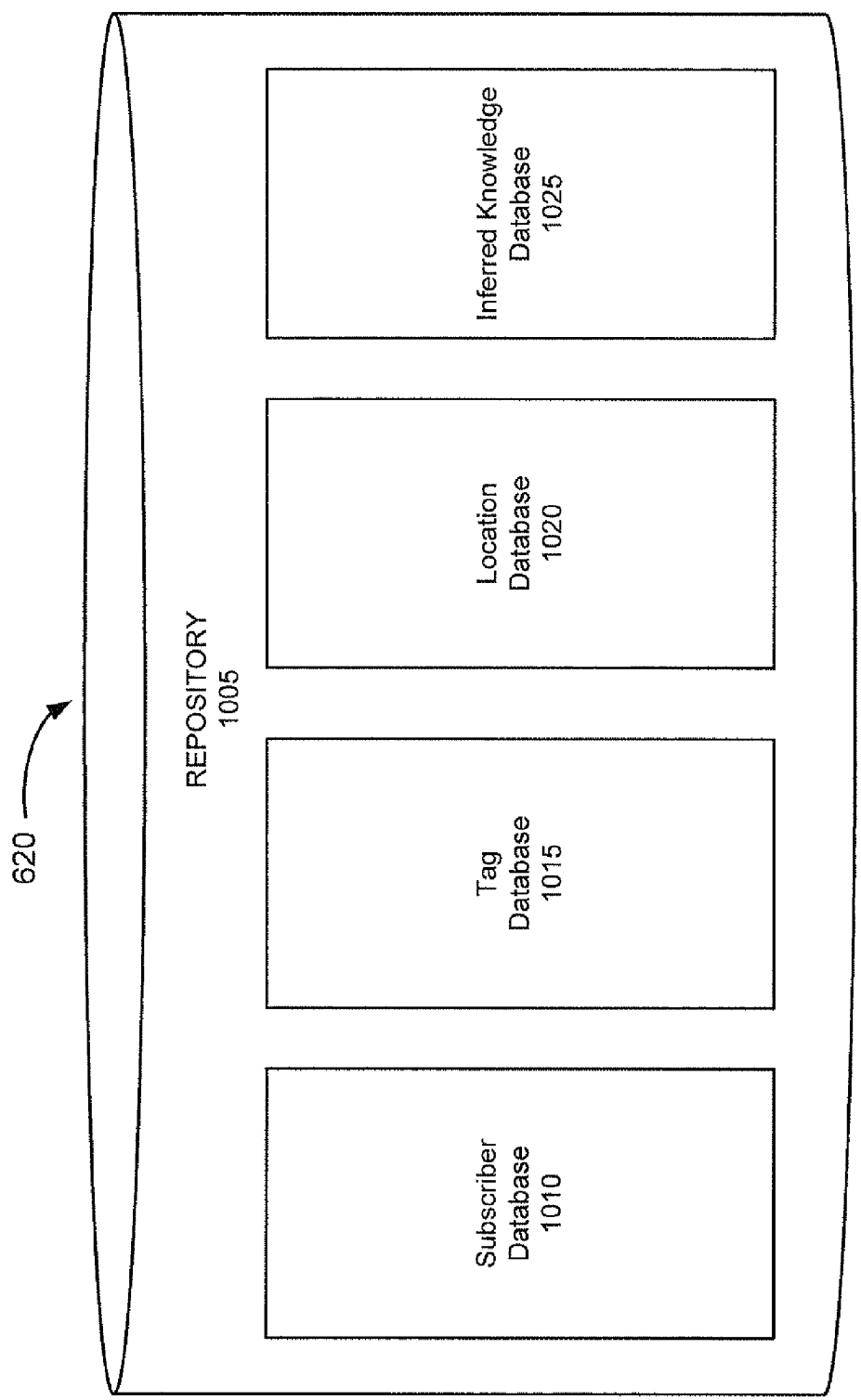
FIG. 10 is a diagram illustrating exemplary data that may be stored by an exemplary tag central of the network depicted in FIG. 6.

FIG. 10 is a diagram illustrating data that may be stored in tag central 620. As illustrated, tag central may include a repository 1005. Repository 1005 may include one or more databases. For example, repository 1005 may include a subscriber database 1010, a tag database 1015, a location database 1020, and an inferred knowledge database 1025.

Subscriber database 1010 may include data relating to users, such as user 610. As described herein, this data may sometimes be referred to as user profile information. For example, subscriber database 1010 may include personal information (e.g., name, address, telephone number, age, income, marital status, and/or profession), type of service(s) a user subscribes to for terminal 605 (e.g., telephone service, Internet service, text messaging service, e-mail service, family plan, etc.), contact information (e.g., email address, telephone number, etc.). Subscriber database 1010 may also include user preference information.

Tag database 1015 may include data relating to transponders, such as tags 615. As described herein, this data may sometimes be referred to as tag profile information. For example, tag database 1015 may include tag identifiers, interpretation of the tag identifiers (e.g., type of product or item (e.g., food), specific product or item (e.g., carrots)), country identifiers, store identifiers, price, quantity, size, color, material (e.g., wool or cotton clothing), food-related information (e.g., low-fat or organic), manufacturer, and/or other types of information related to the item or product.

Location database 1020 may include information relating to locations or areas. As described herein, this data may sometimes be referred to as location profile information. For example, location database may include GPS information, city, county, region, state, and/or country information. Additionally, or alternatively, location database 1020 may include names of retailers or stores, malls, shopping districts, street, and/or address information. Additionally, or alternatively, location database 1020 may include more precise location information, such as departments or areas within, for example, a store (e.g., a mens clothing area or a household goods area).

Inferred knowledge database 1025 may include predictive data. The inferred information may be generated by data mining engine 630 based on user profiles, tag profiles, location profiles, and/or other information collected and/or received by operator network 625. The inferred information may include relationships, patterns, correlations, etc., among the various forms of information that operator network 625 collects and/or receives. For example, the inferred information may include demographic data relating to users, locations, and/or tags.

Although FIG. 10 illustrates exemplary data that may be stored in tag central 620, in other implementations, tag central 620 may include fewer, additional, and/or different types of data. Additionally, or alternatively, one or more types of data, as described herein, may be stored in one or more other devices in network 600, including, or excluding tag central 620. For example, one or more types of data may be stored in terminal 605, data mining engine 630, and/or other nodes not specifically illustrated or described in operator network 625.

As described herein, terminal 605 may collect data that may be forwarded to an operator network 625. Data mining engine 630 may, together with for example, data in tag central 620, etc., gain knowledge about an environment of user 610. Based on the environmental data, data mining engine 630 may generate inferred knowledge that may provide, for example, personalized applications and/or services for users, such as user 610. In other words, the concepts described herein may provide a network that is aware of its environment (e.g., context) based on an extraction and an interpretation of environmental data so as to adapt the functionality of the network to a current context of use by a user(s).

FIGS. 11A-11F are flow charts illustrating an exemplary process 1100 that may be associated with the concepts described herein. In some instances, process 1100 may be described with respect to network 600 depicted in FIG. 6. Process 1100 may include continue blocks (e.g., continue 1112, continue 1128, etc.). These continue blocks are non-functional blocks that are included only as a connection point from one Figure to the next Figure. Accordingly, no description with respect to a continue block is provided herein. Additionally, it will be appreciated that operator network 625 and data mining engine 630 may be used interchangeably to describe an operation performed with respect to a block.

Process 1100 may begin with transmitting radio frequency (RF) signals (block 1102). For example, terminal 605 may be emitting radio signals in a location. The radio signals may be associated with NFC to tags 615. In one implementation, the radio signals may relate to NFC with RFID tags. In other instances, the radio signals may relate to NFC employing Bluetooth, UWB, WUSB, etc.

A tag_ID may be transmitted (block 1104). For example, if tag 615 receives the RF signals, tag 615 may transmit an identifier (e.g., a serial number or a tag_ID) back to terminal 605. Additionally, tag 615 may transmit other types of information (e.g., type or class of product, manufacturer, price, size, quantity, etc.) to terminal 605. Tag 615 may be a passive, active, or semi-passive tag. In the instance that tag 615 is a passive tag, the RF signals received from terminal 605 may provide power (e.g., through induction) for tag 615 so that tag 615 may transmit tag_ID to terminal 605.

The tag_ID may be collected and a timestamp may be set (block 1106). For example, terminal 605 may receive the tag_ID from tag 615. Terminal 605 may generate a timestamp with the tag_ID. The timestamp may provide information as to when tag 615 was in a reachable distance to terminal 605.

It may be determined whether there is consent for storing data and data mining processing (block 1108). For example, terminal 605 may allow user 610 to either have or not have data forwarded to tag central 620 and/or operator network 625. For example, NFC component 905 may allow a user to signify his or her consent. If terminal 605 is set not to have data forwarded (block 1108—NO), then process 1100 may be stopped (block 1110). In such instances, a new session may automatically begin again at block 1102 since terminal 605 may always be emitting RF signals until, for example, a reading mode of terminal 605 is turned off (e.g., by NFC component 905).

On the other hand, if there is consent for storing data and data mining processing (block 1108—YES), then one or more parameters may be set (blocks 1114, 1116 and/or 1118 of FIG. 11B) for providing consent to store data and data mining processing. That is, a location_ID parameter may be set (block 1114), a user_ID parameter may be set (block 1116), and/or a tag_ID parameter may be set (block 1118). In one implementation, the consent or non-consent of the location_ID, the user_ID, and the tag_ID parameter may be represented by a flag (e.g., a bit value) within a communication to operator network 625, as described further below. Additionally, the location_ID, the user_ID, and/or the tag_ID parameter may include further information when consent is given. For example, a location_ID may include one or more character strings that correspond to a location of user 610 that provides an association between a location and a tag_ID at a particular time. The user_ID parameter may include an identifier of user 610. For example, the user_ID may include user 610's telephone number, an identifier of terminal 605 (e.g., an international mobile equipment identifier (IMEI), a mobile equipment identifier (MEID), or an electronic serial number (ESN)), an identifier associated with a SIM card (e.g., a mobile subscriber integrated service digital network (MSISDN) number or an international mobile subscriber identity (IMSI)), etc. The tag_ID parameter may include an identifier of a tag (e.g., an EPC).

If the location_ID parameter is set, there may be a determination of whether there is location information available (block 1120). For example, NFC component 905 on terminal 605 may determine whether terminal 605 receives GPS information and/or has, for example, location information stored (e.g., map information typed in by user 610). If location information is not available (block 1120—NO), then process may continue to block 1126, as described further below. On the other hand, if location information is available (block 1120—YES), NFC component 905 may obtain the GPS information associated with the tag_ID and timestamp (block 1122). That is, location information (e.g., GPS information) may be associated with the timestamp so that the location information corresponds to the tag_ID at that time.

A location_info_exist parameter may be set (block 1124). That is, if location information is available on terminal 605, the location_info_exist parameter may be set. The location_info_exist parameter may include GPS information and/or other location information, for example, stored on terminal 605.

Tag_ID of a location may be filtered out (block 1126). For example, terminal 605 may filter tag_IDs based on whether the tag_ID was previously sent to operator network 625 or not. In one implementation, terminal 605 and/or NFC component 905 may provide a time setting for filtering tag_IDs. In this way, if user 610 should be near a particular tag_ID on two separate occasions that are close in time, the tag_ID may be filtered out. If terminal 605 already sent a tag_ID relating to the location to, for example, operator network 625 (Already Sent—Block 1126), process 1100 may be stopped (block 1110). In such instances, a new session may automatically begin again at block 1102 since terminal 605 may always be emitting RF signals until, for example, a reading mode of terminal 605 is turned off (e.g., by NFC component 905).

On the other hand, if terminal 605 did not already send the tag_ID to, for example, operator network 625 (Not Already Sent—Block 1126), terminal 605 may filter the tag data (e.g., due to overflow) so that, for example, only the first and/or the last occurrence of the received tag data may be transmitted to operator network 625. That is, since tag 615 may be continuously sending tag data (e.g., tag_ID, etc.) to terminal 605, redundant information may be generated in terminal 605, particularly if user 610 is looking at a product and/or remains in a location for a period of time. Based on a first and a last occurrence of data transmissions, operator network 625 may determine the period of time that user 610 looked at a particular item, was near a particular product, and/or in a certain area or location. Additionally, or alternatively, operator network 625 and/or data mining engine 630 may provide for this filtering process.

Figure 11A:
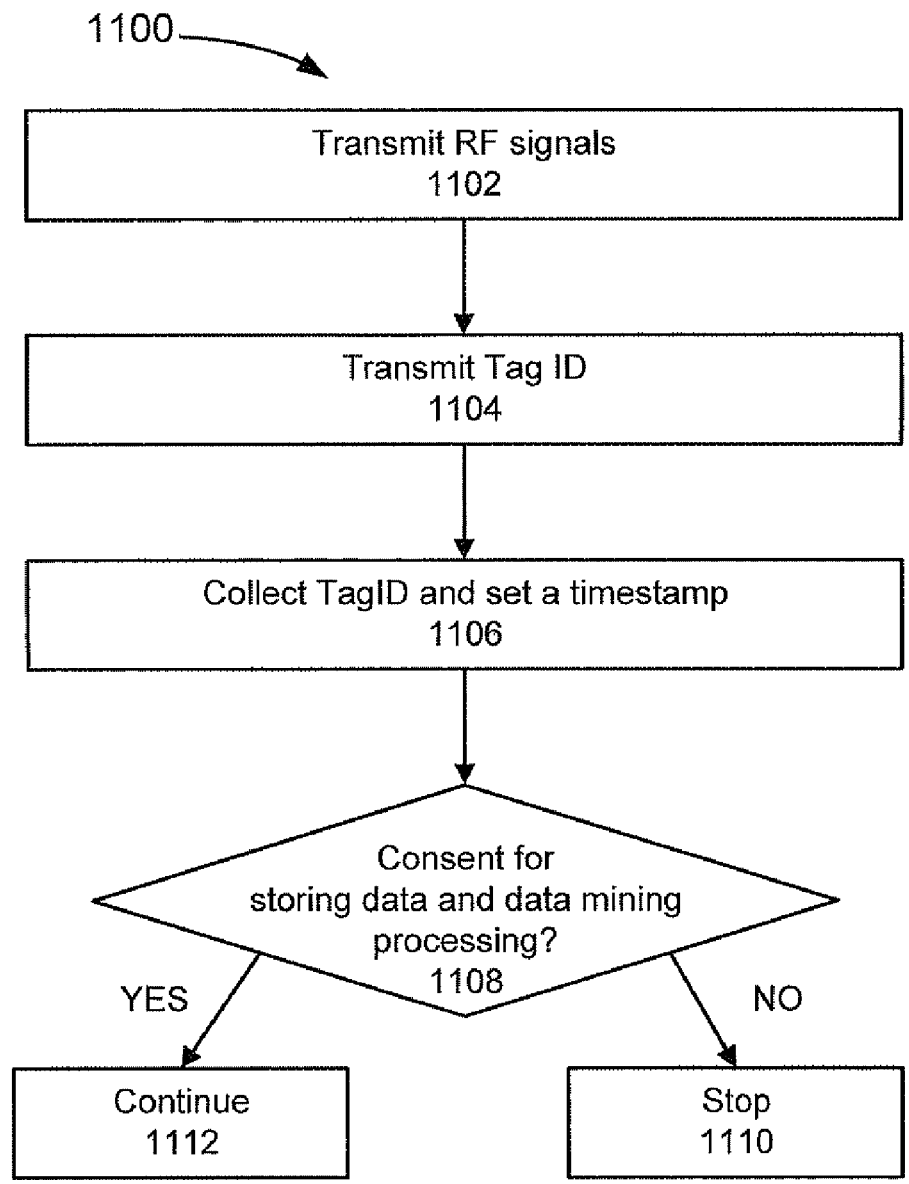
FIGS. 11A-11F are flow diagrams of a process that may be associated with the concepts described herein.
Figure 11B:
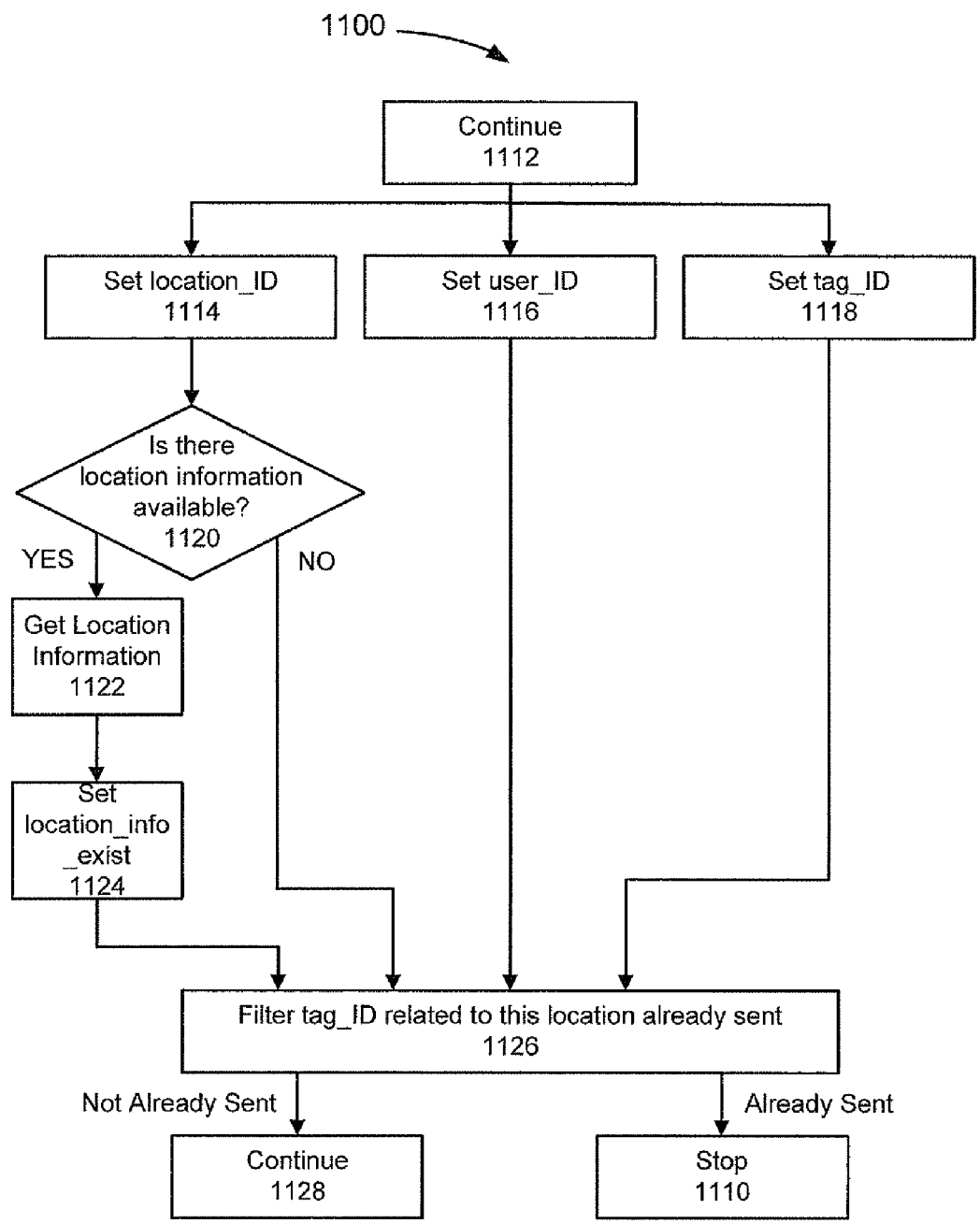
Figure 11C:
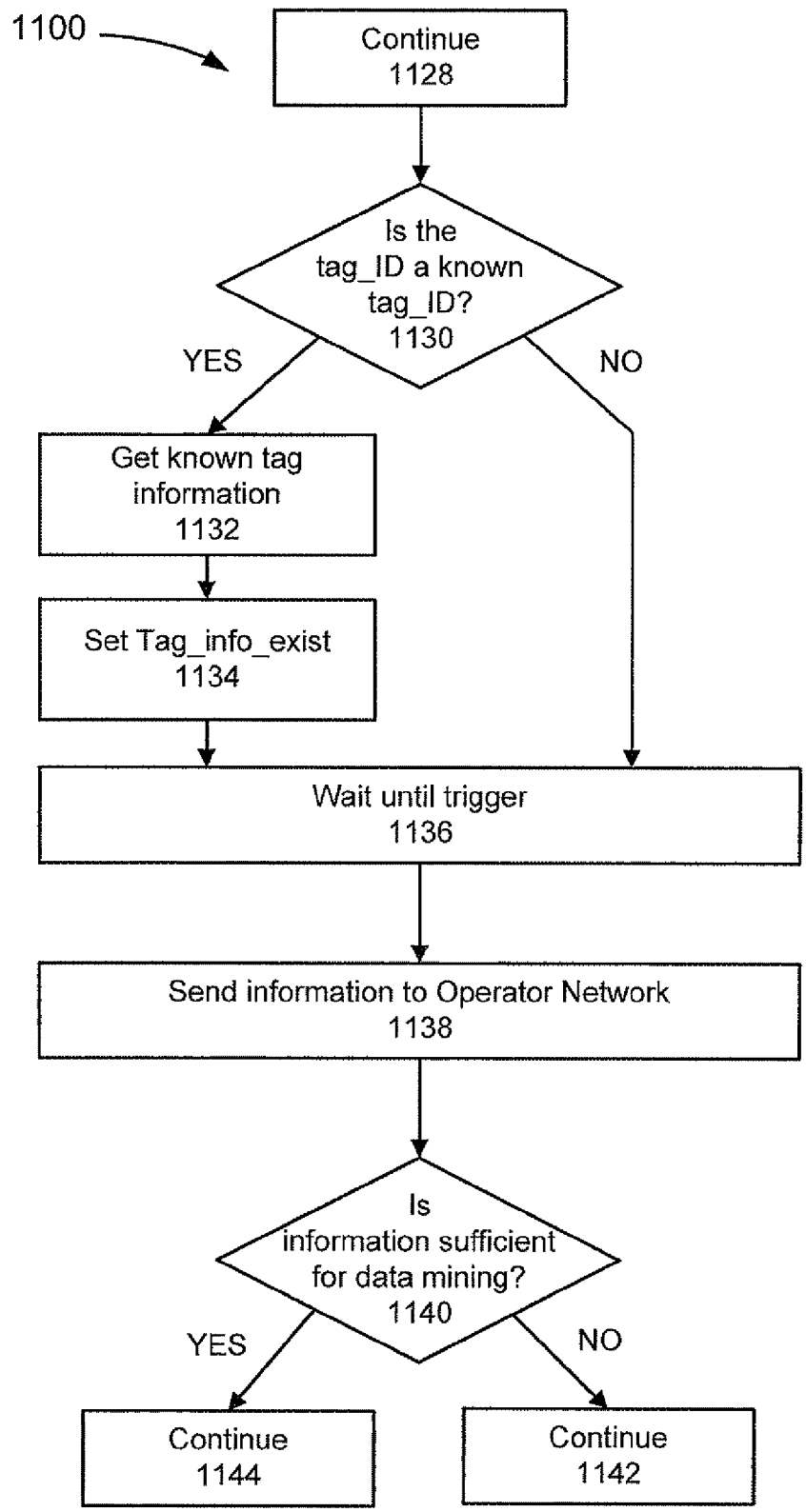

It may be determined whether the tag_ID is a known tag_ID (block 1130), as illustrated in FIG. 11C. Terminal 605 may store a known tag_ID in storage unit 820. In such instances, the tag_ID may relate to a tag worn by user 610 (e.g., on clothing, on a watch, etc.) or the tag_ID may relate to a tag on a product owned by user 610 (e.g., at home, at work, in the car, etc.). For example, the tag_ID may correspond to user 610's house keys, television, favorite shirt, etc.

If it is determined that the tag_ID is a known tag_ID (block 1130—YES), then terminal 605 may obtain known tag information (block 1132). The tag information may include an interpretation of what the tag_ID means and/or a type of tag_ID. For example, the tag information may specify the type of product (appliance, clothing, etc.), what the product is (radio, stereo, keys, shirt, etc.), and/or brand of product, etc. Tag information may also include inferred knowledge from user 610 (e.g., an important item (e.g., house keys), a home item, etc.), user preferences, etc. Terminal 605 may obtain the information from storage unit 820, tag central 620, and/or operator network 625.

Also, a tag_info_exist parameter may be set (block 1134). For example, the tag_info_exist parameter may include the tag information. Process 1100 may continue to block 1136, as described more fully below.

On the other hand, if it is determined that the tag_ID is not a known tag_ID (block 1130—NO), process 1100 may continue to block 1136.

A waiting period may occur (block 1136). For example, in one implementation, a triggering mechanism (e.g., a threshold value) in terminal 605 (e.g., which may be part of NFC component 905) may determine when there is a sufficient number of tags around user 610 to enable a description of the specific surroundings or environment of user 610. For example, such an implementation may provide a more efficient use of network resources by not allowing terminal 605 to continuously communicate, for example, the tag information, with, for example, other devices in network 600. Additionally, or alternatively, operator network 625 and/or data mining engine 630 may provide for this functionality, for example, as described below in reference to block 1140.

Process 1100 may continue with sending the information to operator network 625 (block 1138). For example, terminal 605 may send all the information (e.g., tag_IDs, tag information, user_ID, location_ID, etc.), to operator network 625. In other instances, depending on, for example, user consent (block 1108) and/or user preferences, only a portion of information may be sent. For example, terminal 605 may send only tag_ID type. In one implementation, terminal 605 may send the information when a threshold value is met, as previously described.

However, some form of user_ID may be obtained, regardless of user 610 consent, since network operator network 625 may have the ability to identify terminal 605 (e.g., a terminal ID). Nevertheless, as will be described below with respect to block 1160, if user 610 does not want the user_ID parameter to be considered by data mining engine 630, the user_ID parameter will not be utilized.

Figure 11D:
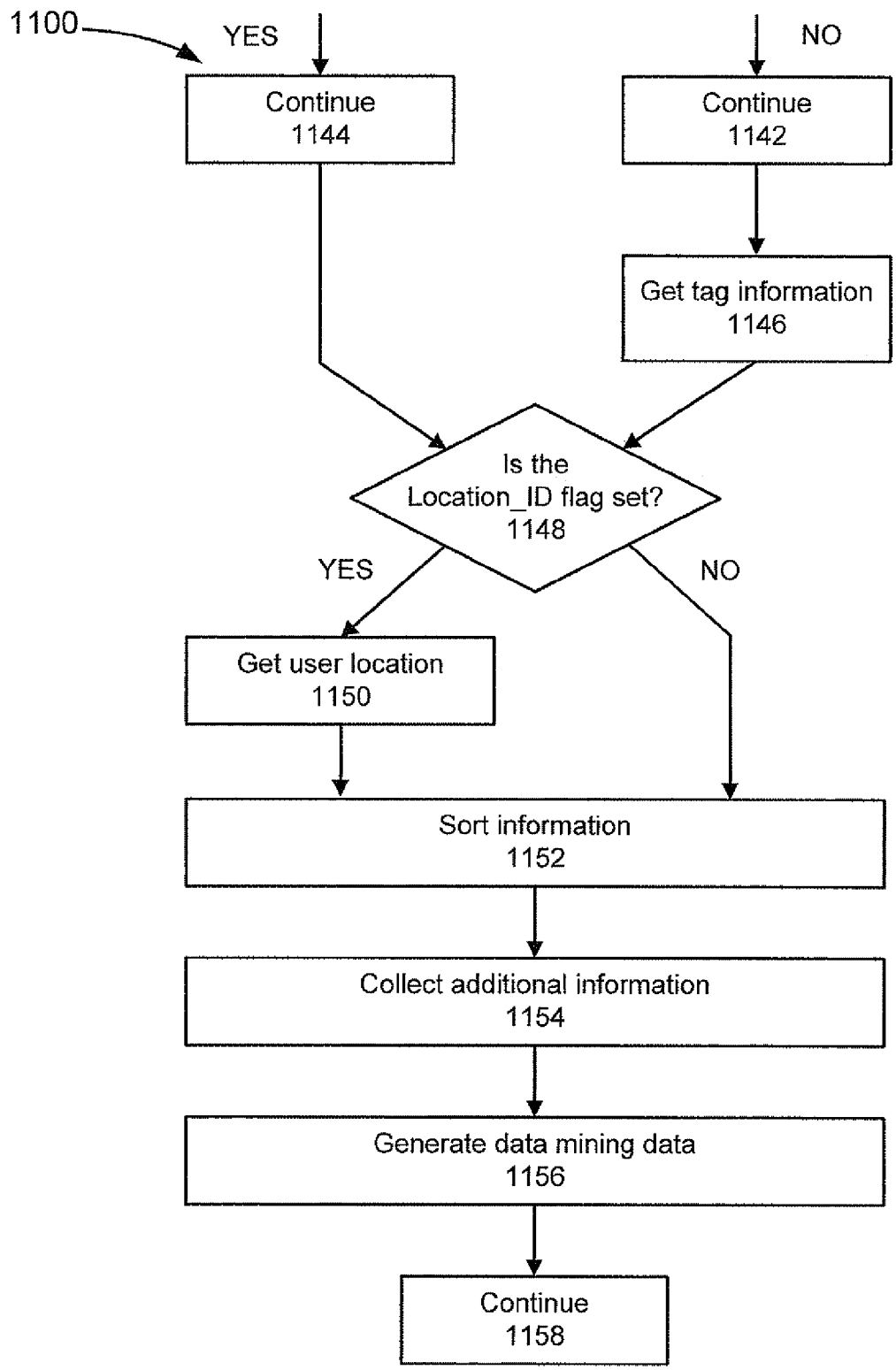
Figure 11E:
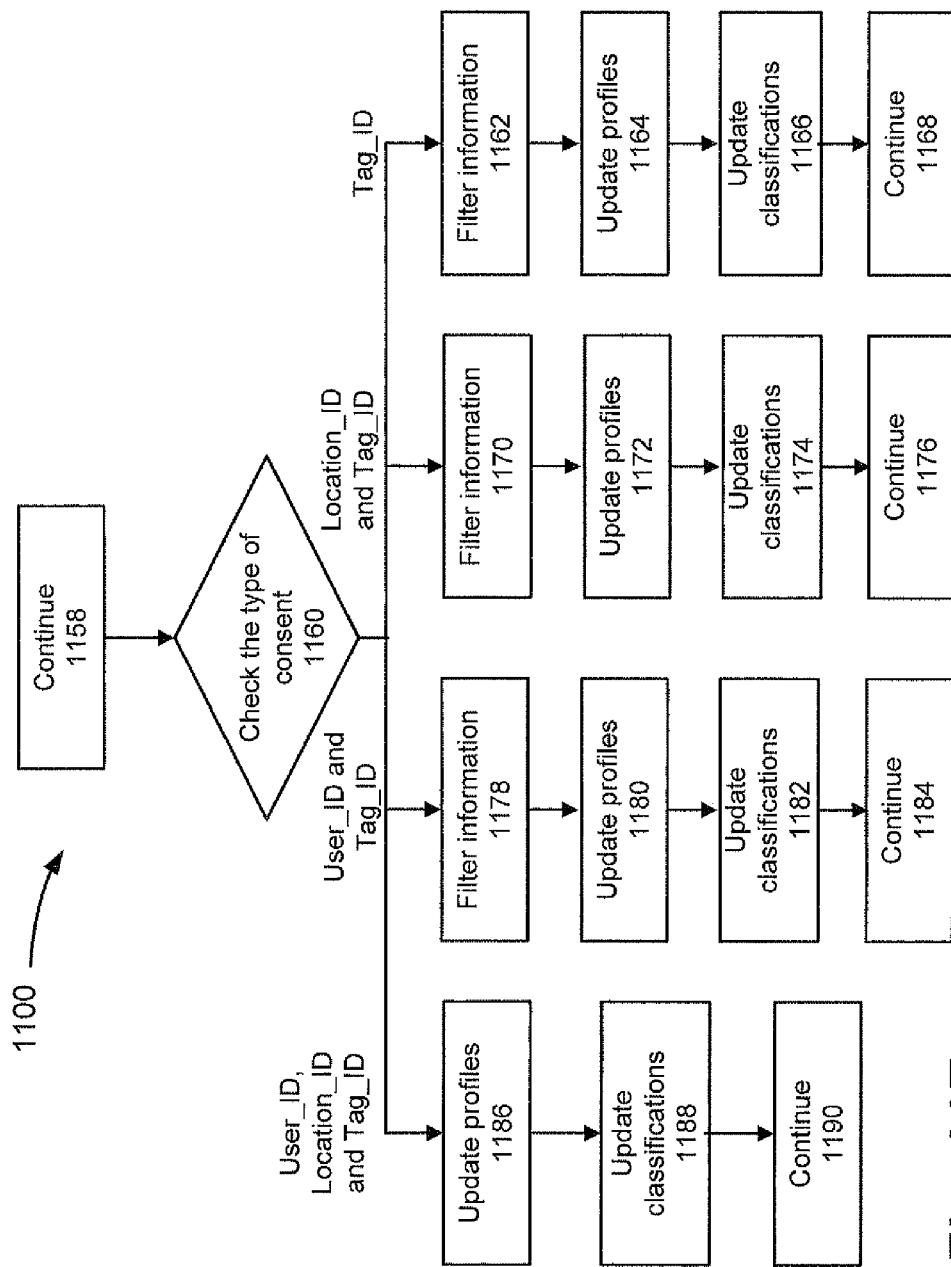

It may be determined if the information is sufficient for data mining (block 1140). For example, operator network 625 may check if the tag_info_exist parameter was received and/or that there is sufficient information for data mining. If it is determined that there is not sufficient information (block 1140—NO), then additional information may be obtained (block 1146), as illustrated in FIG. 11D. For example, operator network 625 may obtain tag information associated with a tag_ID from tag central 620, the Internet, or other sources. If it is determined that there is sufficient information (block 1140—YES), then process 1100 may proceed to block 1148 as described below.

Next, it may be determined whether the location_ID parameter is set (block 1148). Operator network 625 may inspect the information received from terminal 605 to determine whether the location_ID is set (i.e., that there is user consent relating to location_ID). Additionally, or alternatively, operator network 625 may inspect the information received from terminal 605 to determine if the location_info_exist parameter was received. If the location_ID is set (block 1148—YES), the location of user 610 may be obtained (block 1150). For example, if the location_ID parameter was received, but the location_info_exist parameter was not received, location information may be obtained based on, for example, triangulation, trilateration, cell identification, roaming information (e.g., a visitor location register (VLR)), hyperbolic positioning, etc.). In such instances, a user_ID (e.g., a terminal identifier) may be utilized to obtain the location information, even when there is no consent for the user_ID.

On the other hand, if the location_ID is not set (block 1148—NO), process 1100 may continue with block 1152, as described more fully below.

The information may be sorted (block 1152). For example, all the information may be sorted and normalized (e.g., to minimize duplication of information). For example, all the information may be sorted and normalized based on location as an attribute, the user_ID as an attribute, and/or some other information. For example, if location is employed as an attribute, the environmental data may be associated with one or more locations. Additionally, or alternatively, if the user_ID is employed as an attribute (if there is user consent), the environmental data may be associated with one or more users.

Additional information may be collected (block 1154). For example, additional information may be collected from operator network 625, tag central 620, another network (e.g., the Internet), and/or from some other source. For example, the additional information may include demographic data, etc., that provides broader background information about user(s) and/or location(s). Additionally, or alternatively, additional information may include pictures captured from terminal 605 and/or other information (e.g., meta data).

Data mining data may be generated (block 1156). Data mining engine 630 may generate data mining data based on the information collected from one or more users. In this regard, data mining engine 630 may determine relationships and/or correlations between or among the information collected. For example, data mining engine 630 may create an environment profile (e.g., product information surrounding a user at a location) based on the information collected from one or more users. Additionally, or alternatively, data mining engine 630 may create other profiles that include relationships between multiple users, etc. Data mining engine 630 may also generate inferred information/knowledge and associate the inferred information/knowledge with the location and/or environment profile. Consequently, a location may be enriched with the information generated and/or associated therewith based on data mining engine 630. Additionally, data mining engine 630 may enrich user profiles and/or tag profiles based on the environment profile and/or the inferred information/knowledge.

Figure 11F:
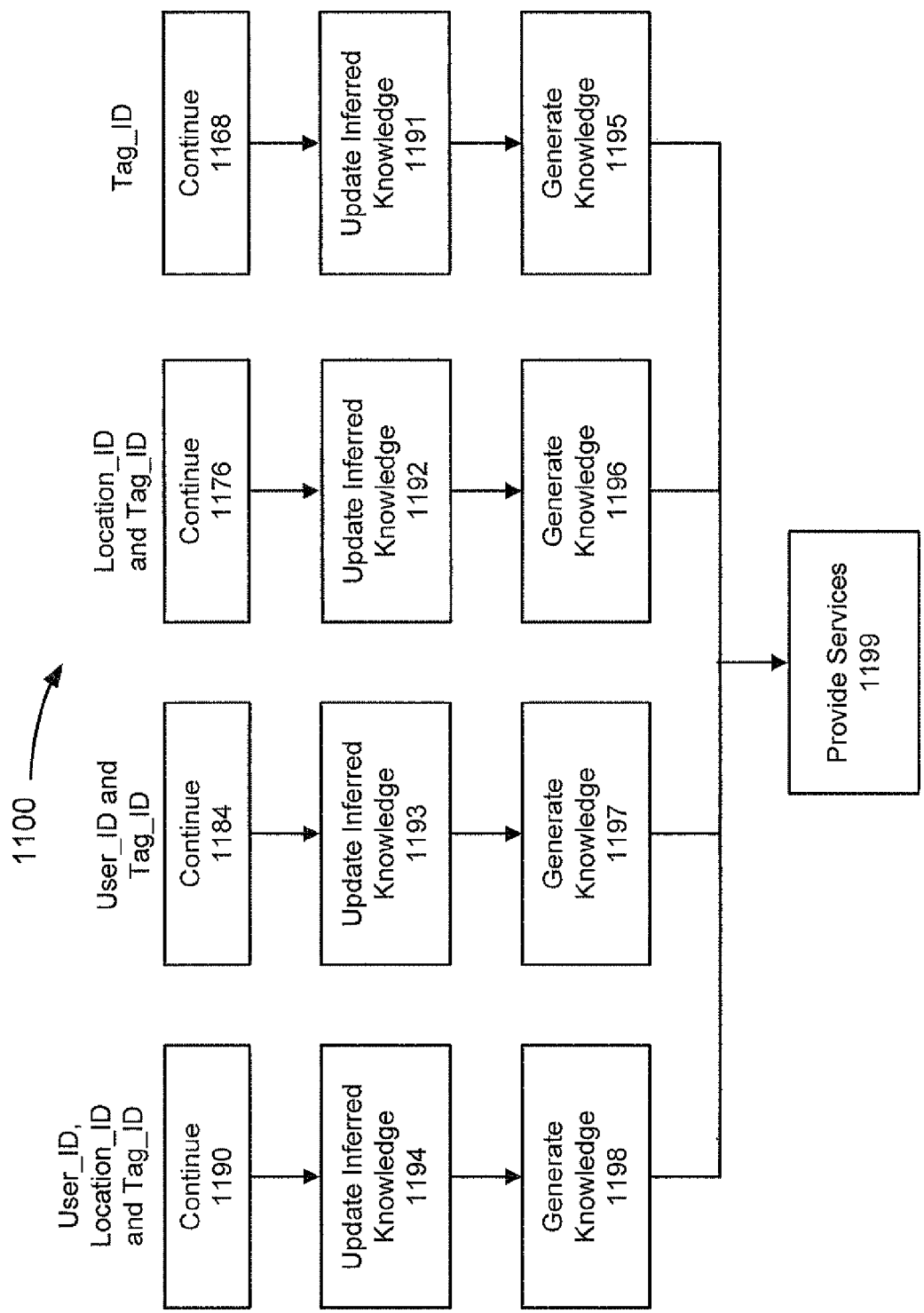

The type of consent may be checked (block 1160), as illustrated in FIG. 11F. For example, data mining engine 630 may determine parameters associated with user consent, such as location_ID, user_ID, and tag_ID. In one implementation, tag_ID may always be set, otherwise process 1100 may stop (block 1110).

Depending on the user consent, different branches may be formed. For example, in a first branch, it is assumed that only tag_ID consent exists; in a second branch, it is assumed that location_ID and tag_ID consent exists; in a third branch, it is assumed that user_ID and tag_ID consent exists, and in a fourth branch, it is assumed that user_ID, location_ID, and tag_ID consent exists.

Beginning with the first branch, information may be filtered (block 1162). For example, since user_ID consent does not exist, data mining engine 630 may not relate information from block 1156 with a user or a user_ID. Additionally, since location_ID consent does not exist, data mining engine 630 may not relate information from block 1156 with the location of the user or the location_ID.

Profiles may be updated (block 1164). For example, a tag profile may be updated based on the information from block 1156. For example, operator network 625 may update repository 1005.

Classifications may be updated (block 1166). Classifications of the tag_ID may be updated. For example, a tag_ID that corresponds to television may be classified as electronics and/or home appliance. Additionally, or alternatively, other information may be utilized. For example, a tag_ID (e.g., an EPC code) may include information that reveals the manufacturer of the product and/or the model of the product. In such instances, a tag_ID may be classified based on this type of information. In this way, classifications of tag_IDs may be updated by grouping together unique tag_IDs sharing, for example, one or more relationships depending on, for example, the granularity of the classifications and/or the type of tag information utilized.

Referring to the second branch, information may be filtered (block 1170). For example, since user_ID consent does not exist, data mining engine 630 may not relate information from block 1156 (e.g., tag information, environmental information, inferred knowledge, etc.) with a user or a user_ID.

Profiles may be updated (block 1172). For example, a tag profile and a location profile may be updated based on the information from block 1156. For example, operator network 625 may update repository 1005.

Classifications may be updated (block 1174). Classifications of the tag_ID and the location_ID may be updated. In one implementation, tag_ID classifications and location_ID classifications may be updated. In other implementations, tag_ID and location_ID classifications may be updated (i.e., as a collective). In still other implementations, updates to tag_ID classifications, locations_ID classifications, and tag_ID and location_ID classifications may be performed.

Tag_ID classification may be updated analogous to that previously described in block 1166. A location_ID may be classified based on geographical criteria (e.g., city, state, country, etc.) and/or other types of locale classifications (e.g., Macys, mens clothing department, sporting goods store, etc.). In this way, classifications of location_IDs may be updated by grouping together unique location_IDs sharing, for example, one or more relationships, depending on, for example, the granularity of the classifications and/or the type of location information utilized.

Additionally, or alternatively, a location_ID and tag_ID classification may be updated. Location_ID and tag_ID may be classified based on, for example, various combinations of criteria belonging to a location_ID classification and a tag_ID classification. For example, a location_ID and a tag_ID may be classified based on store type and specific type of product, or region and manufacturer. In this way, classifications of location_ID and tag_IDs may be updated by grouping together unique location_IDs with unique tag_IDs.

Referring to the third branch, information may be filtered (block 1178). For example, since location_ID consent does not exist, data mining engine 630 may not relate information from block 1156 with the location of the user or the location_ID.

Profiles may be updated (block 1180). For example, a tag profile and a user profile may be updated based on the information from block 1156. For example, operator network 625 may update repository 1005.

Classifications may be updated (block 1182). Classifications of the tag_ID and user_ID may be updated. In one implementation, tag_ID classifications and user_ID classifications may be updated. In other implementations, tag_ID and user_ID classifications may be updated (i.e., as a collective). In still other implementations, updates to tag_ID classifications, user_ID classifications, and tag_ID and user_ID classifications may be performed.

Tag_ID classification may be updated analogous to that previously described in block 1166. A user_ID may be classified based on, for example, frequency of use, frequency of consent, types of consent, kind of subscriber service, and/or type of terminal 605. Additionally, or alternatively, a user_ID may be classified based on other types of criteria (e.g., age, income, etc.) In this way, classifications of user_IDs may be updated by grouping together unique user_IDs sharing, for example, one or more relationships, depending on, for example, the type of user information utilized.

Additionally, or alternatively, a user_ID and tag_ID classification may be updated. In one implementation, a user_ID and tag_ID may be classified based on, for example, various combinations of criteria belonging to a user_ID classification and a tag_ID classification. For example, a user_ID and a tag_ID may be classified based on age and specific type of product, or frequency of use, kind of subscriber service, and class of product. In this way, classifications of user_ID and tag_IDs may be updated by grouping together unique user_IDs and tag_IDs sharing, for example, one or more relationships, depending on, for example, the granularity of the classifications and/or the type of user and tag information utilized.

Referring to the fourth branch, profiles may be updated (block 1186). For example, a tag profile, a user profile, and a location profile may be updated based on the information from block 1156. For example, operator network 625 may update repository 1005.

Classifications may be updated (block 1188). Classifications of the tag_ID, user_ID, and location_ID may be updated. As previously described, tag_ID, user_ID, and/or location_ID classifications may be updated individually and/or collectively. From an individual standpoint, tag_ID classifications may be updated analogous to that previously described in block 1166, location_ID classifications may be updated analogous to that previously described in block 1174, and user_ID classifications may be updated analogous to that previously described in block 1182. Additionally, or alternatively, location_ID and tag_ID classifications may be updated analogous to that previously described in block 1174, and/or user_ID and tag_ID classifications may be updated analogous to that previously described in block 1182.

Additionally, or alternatively, a user_ID, a location_ID, and a tag_ID classification may be updated. In one implementation, a user_ID, a location_ID, and a tag_ID may be classified based on, for example, various combinations of criteria belonging to a user_ID classification, a location_ID classification, and a tag_ID classification. For example, a user_ID, location_ID, and a tag_ID may be classified based on age, city, and product type. In this way, classifications of user_ID, location_ID, and tag_ID may be updated by grouping together unique user_IDs, location_IDs, and tag_IDs sharing, for example, one or more relationships, depending on, for example, the granularity of the classifications and/or the types of user, location and tag information utilized.

Referring to FIG. 11F, each of the four branches may update inferred knowledge (blocks 1191, 1192, 1193, and 1194). In one implementation, data mining engine 630 may update repository 1005 (e.g., inferred knowledge database 1025) and/or tag central 620 (which may include inferred knowledge). As previously described, the inferred information may include relationships, patterns, correlations, etc., among the various forms of information that operator network 625 collects and/or receives. For example, the inferred information may include demographic data relating to users, locations, and/or tags. Additionally, for example, clusters of users (e.g. clusters of users based on products purchased, locations, etc.), collaborative filters (e.g., groupings among users, locations, and/or products), preferences of users (e.g., associated with user(s) tendencies, purchasing habits, stores frequented, etc.), micro-segments (associations between locations, products, stores, users, formations of social networks, etc.), and/or services (e.g., how often users utilize the services, what services, etc.) may be updated.

Additionally, referring to FIG. 11F, each of the four branches may generate knowledge (blocks 1195, 1196, 1197, and 1198). In block 1195, operator network 625 may be provided with knowledge about the environment that an anonymous user may be located by interpreting the information associated with the tag_ID. For example, if one or more tags 615 relate to a tent, a backpack, and a sleeping bag, an environment, such as a sporting goods store or a sporting goods department may be inferred.

In block 1196, operator network 625 may be provided with knowledge about the environment that an anonymous user may be located by interpreting the information associated with the tag_ID and the location_ID. For example, an environment may be mapped to a particular location. Additionally, or alternatively, operator network 625 may be provided with relationships involving other locations having a similar environment. In such instances, operator network 625 may be provided with various attributes associated with a location and/or an environment, such as frequency of visits, duration of visits, number of purchases made, products purchased, etc., based on the anonymous users of operator network 625. This type of information may be used comparatively among other similar locations and/or environments.

In block 1197, operator network 625 may be provided with knowledge about the environment that user 610 may be located by interpreting the information associated with the user_ID and the tag_ID. For example, an environment may be mapped to a particular user. That is, analogous to block 1195, an environment may be constructed based on, for example, the information associated with the tag_ID (s). Additionally, or alternatively, operator network 625 may be provided with relationships involving a user and the type of products that the user finds interesting. For example, operator network 625 may provided with characterizations of the user's personality based on the type of environments the user exposes himself or herself to and/or products the user browses and/or purchases. For example, a user that frequents clothing stores may be considered fashion-conscious, or a user that frequents computer stores may be considered tech-savvy. Additionally, or alternatively, operator network 625 may be provided with relationships involving other users based on, for example, environmental similarities (e.g., types of products), user attributes (e.g., age, income, interests, etc.), types of products at home and/or purchased, etc. In this way, matrices of demographic data may be generated based on environmental profiles, user profiles, products owned, etc.

In block 1198, operator network 625 may be provided with knowledge about the environment that user 610 may be located by interpreting the information associated with the user_ID, the tag_ID, and the location_ID. For example, an environment may be mapped to a particular user and location. Analogous to block 1197, matrices of demographic data and/or relationships may be generated that includes location information.

Services and applications may be provided (block 1199). Based on the accumulation of information and inferred knowledge, various services and/or applications may be deployed for users, the operator, and/or third parties (e.g., business, stores, etc.). For example, from the user's perspective, the operator may provide recommendations to a user relating to purchasing a product, etc. Additionally, third parties may provide a user with coupons, discounts, etc. Conversely, from the operator's perspective and/or a third party perspective, the accumulated information and inferred knowledge may impact business decisions. Additionally, or alternatively, other types of services and applications may be provided, as described below with respect to FIGS. 12A-12D.

Although FIGS. 11A-11F illustrate an exemplary process 1100, in other implementations, fewer, different, or additional operations may be performed. Additionally, or alternatively, the operations described with respect to each block and series of blocks has been described with respect to a particular device or network (e.g., terminal 605, operator network 625, data mining engine 630, etc.). However, in other implementation, these operations may be performed by one or more devices, including or excluding, the particular device or network.

FIGS. 12A-12D are diagrams illustrating examples of the concepts described herein. As illustrated, Carla may be shopping in The Camping Store, a popular store in London for purchasing camping equipment. Carla may be carrying a terminal 605, such as her mobile phone, which includes a reader/transmitter for providing communication with surrounding tags 615. Carla may be interested in purchasing a compass 1205.

In this instance, terminal 605 may be transmitting an RF signal 1210 that is received by a tag 615 attached to compass 1205. In response, tag 615 sends a tag_ID 1215 to terminal 605. Terminal 605 may collect this information and associate a timestamp with the received tag_ID 1215.

Terminal 605 may then check whether there is consent from Carla for the tag_ID or tag_ID type, and if not, giving Carla the option to choose what to do. For example, Carla may select whether to store and/or use a location_ID, a user_ID and/or the tag_ID. If Carla does not wish to collect the compass tag_ID, then the received tag_ID may be deleted. However, if Carla consents to storing and/or using the location_ID, user_ID, and/or tag_ID, then the process may continue. Additionally, or alternatively, terminal 605 may have previously stored user preferences that indicate Carla's consent or non-consent for storing and/or using the tag_ID, the user_ID, and the location_ID.

If Carla sets the location_ID option (e.g., with NFC component 905), terminal 605 may check whether it receives location information (e.g., GPS information). If terminal 605 does receive location information, terminal 605 may collect the information and match this information with the timestamp associated with the tag_ID. Additionally, terminal 605 may set a location_info_exist parameter.

Terminal 605 may check whether the same information recently has been sent to an operator network 625. However, since this tag_ID is for the first time reaching Carla's terminal 605, the process continues.

Carla likes to go camping and has been looking around in other stores before coming to The Camping Store. In this regard, terminal 605 has collected environmental information from these other stores. Accordingly, when terminal 605 checks if there is any additional information (e.g., type of product) about this tag_ID stored on terminal 605 and/or if there exists any additional information from tag central 620 or operator network 625, terminal 605 adds the additional information with the tag_ID. Also, terminal 605 sets the tag_info_exist parameter.

Terminal 605 may have an option to wait before forwarding this information; however, since Carla's operator is keen on getting as much information as possible as soon as possible, terminal 605 forwards the information to operator network 625.

Operator network 625 may check whether the tag_info_exist parameter is set or not. If it is, operator network 625 may determine whether the information received is enough (e.g., has as many parameters that data mining engine 630 or operator network 625 knows is available from, for example, tag central 620). In this instance, Carla's terminal 605 may have stored that the compass tag_ID is gear from a camping store, but does not have access to more specific information. In such an instance, or if there is no tag_ID information received from terminal 605, operator network 605 may forward a request 1235 to a tag_ID central, such as tag central 620, via, for example, the Internet.

Operator network 625 may also check whether there is location_ID consent and/or whether the location_info_exist parameter exists. If location_ID consent exists, but there is no location_info_exist parameter, operator network 625 may determine Carla's location based on triangulation or some other technique.

Operator network 625 may sort all the information collected based on location being a key attribute. In this way, operator network 625 may generate correlations with other locations based on environmental information. Further, to enrich location information of The Camping Store, operator network 625 may collect information from previous visits made by other users at The Camping Store. Operator network 625 learns that Lisa and Sven had been to The Camping Store, and that there is an abundance of camping gear tag information at that location.

Based on the collected information, data mining engine 630 may determine correlations among Lisa, Sven, Carla, and other users. Additionally, data mining engine 630 tries to understand Carla better based on the collected information. Data mining engine 630 may determine that Carla is 29 years old and that she actually lives in Gothenberg, Sweden. Additionally, data mining engine 630 may determine there also lives a girl named Anna at the same home address. Anna may also be a subscriber of operator network 625. By checking Anna's call logs, data mining engine 630 may determine that Anna talks frequently with Lisa. However, data mining engine 630 may determine that this information may not be useful as it pertains to Carla. As a result, data mining engine 630 may decide to analyze previous locations that Carla has visited in the past, and determines that Carla frequents stores similar to Sven.

Figure 12A:
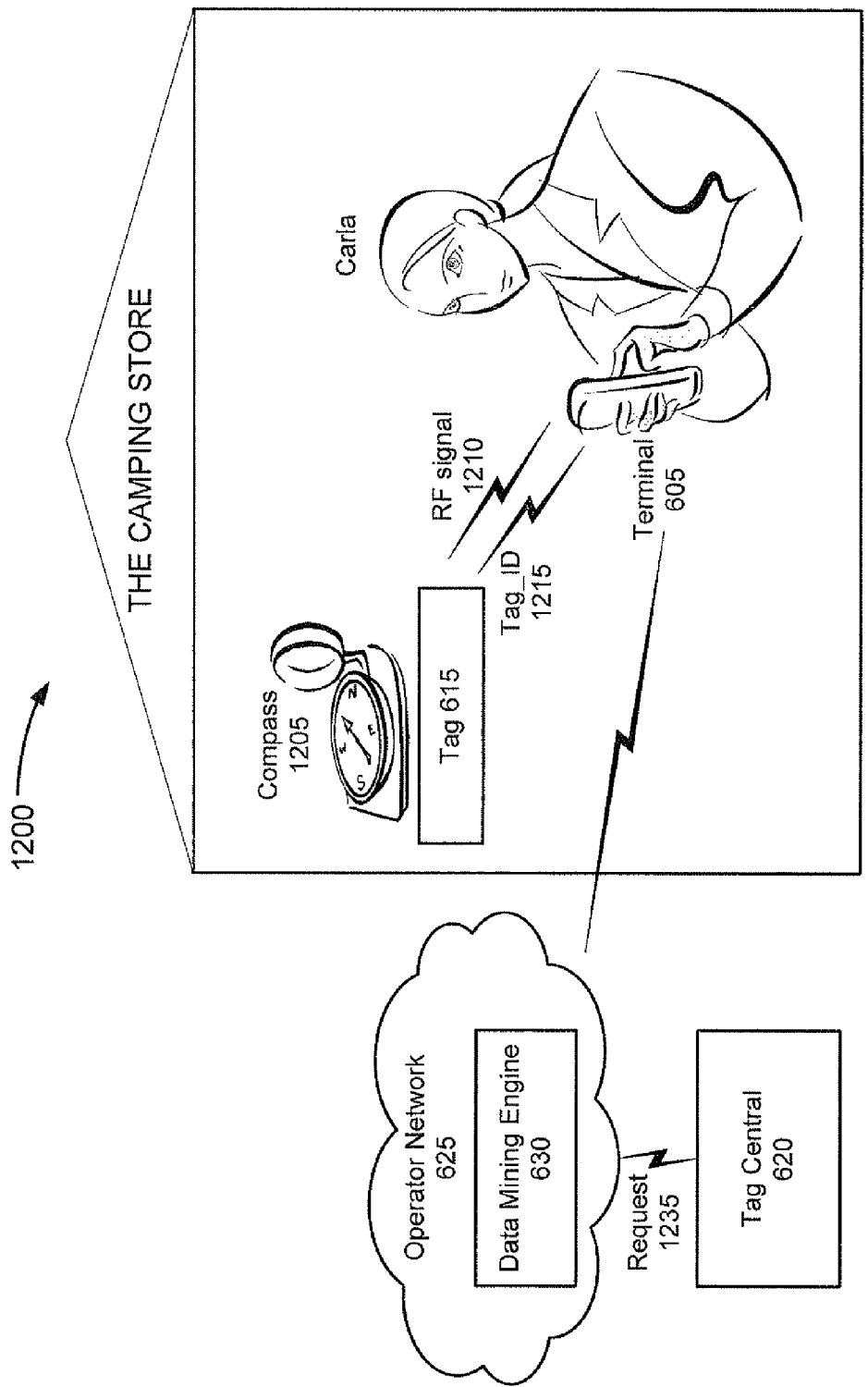
FIGS. 12A-12D are diagrams illustrating examples of the concepts described herein.
Figure 12B:
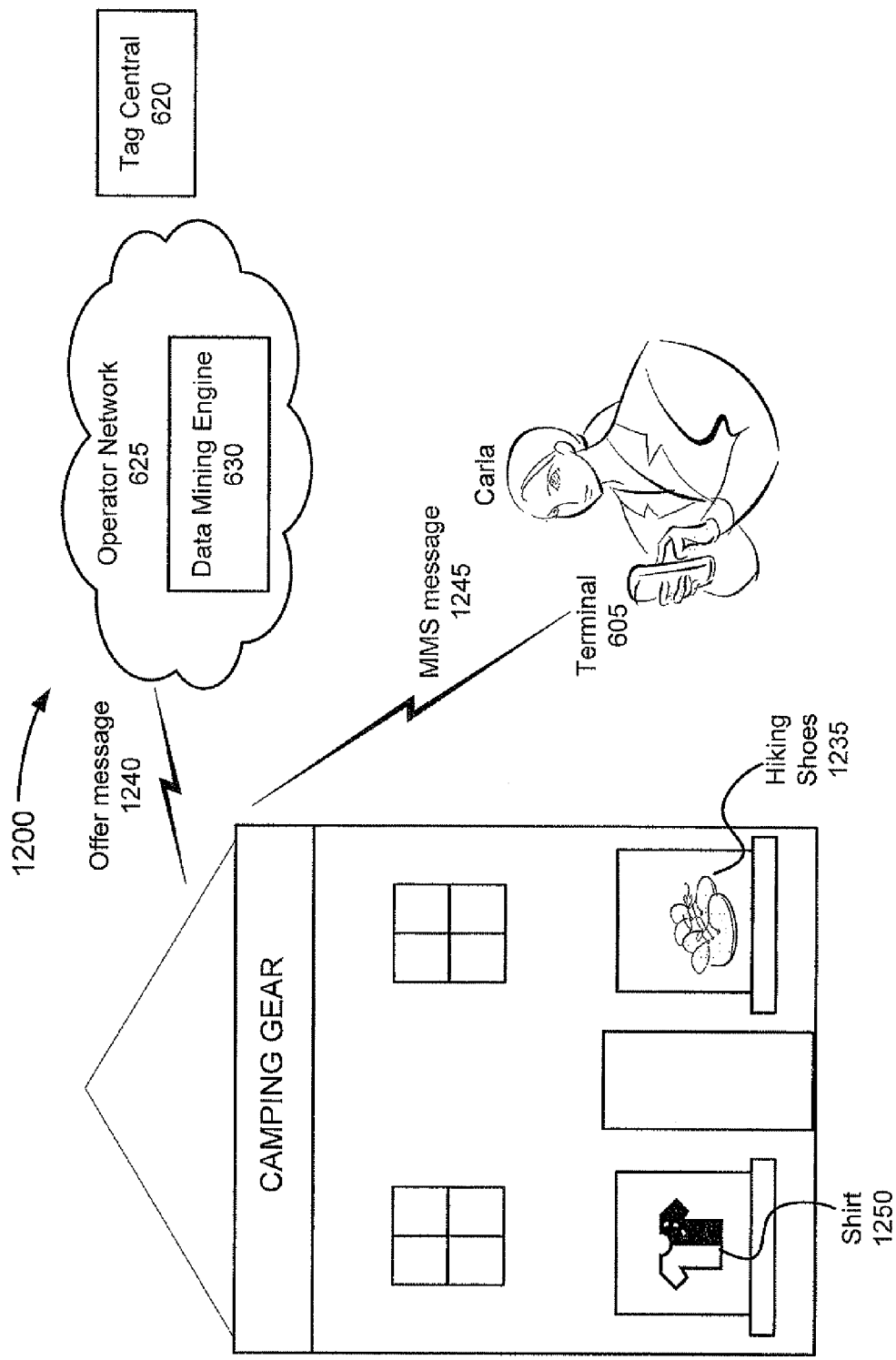

Referring to FIG. 12B, Carla may leave The Camping Store and may be walking down the street. Operator network

625 may update Carla's location and discover that Carla is nearing another stored called Camping Gear. Based on Carla's current location, Carla's profile, and information correlated with Sven, operator network 625 may conclude that Carla may be interested in new hiking shoes 1235. Operator network 625 may send Camping Gear an offer message 1240, based on a business-to-business agreement, to provide Carla with a personalized ad.

Carla may receive, for example, a multimedia messaging system (MMS) message 1245 on her terminal 605 that includes a discount on the hiking shoes 1235. In this regard, the likelihood that Carla will buy the hiking shoes 1235 has increased. Further, if operator network 625 had not chosen to check Carla's profile, operator network 625 may have suggested to Carla to purchase a new cotton shirt 1250, not knowing that Carla is allergic to cotton.

Finally, data mining engine 630 may use the compass tag information from The Camping Store as a history mark, and the process may stop until Carla finds another tag_ID that interests her.

Figure 12C:
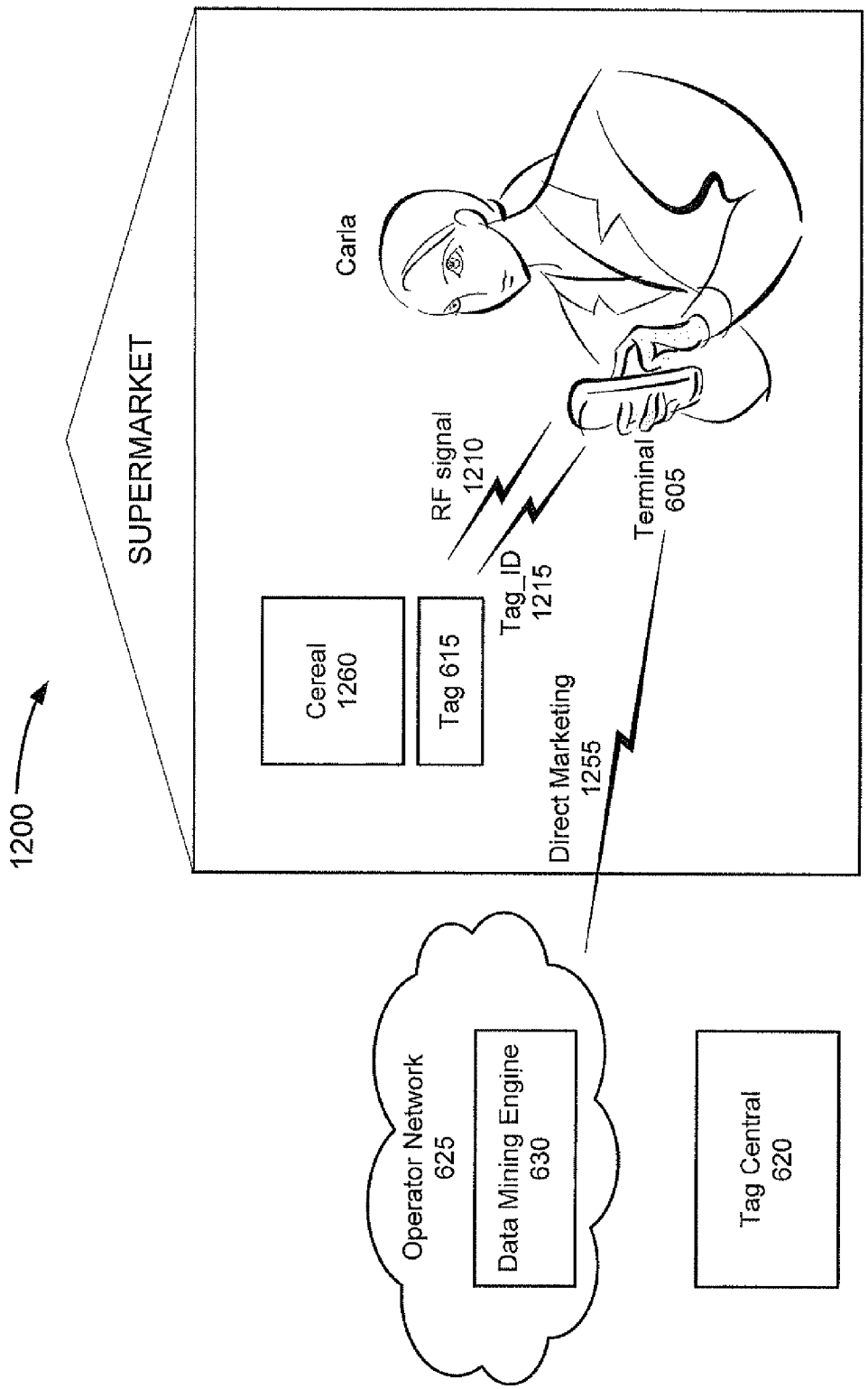

Referring to FIG. 12C, Carla leaves Camping Gear and approaches a supermarket. As Carla approaches the supermarket, terminal 605 may collect information indicating that Carla is approaching the supermarket. For example, tags 615 may be emitting information into a parking lot of the supermarket. When a sufficient number of tags 615 are collected, terminal 605 may send the information to operator network 625. Data mining engine 630 may include the supermarket environment information with other, earlier collected information about Carla (e.g., from operator network 625, demographic data, etc.). As a result, operator network 625 may provide Carla with different services. For example, as Carla begins shopping in the supermarket, operator network 625 may send Carla with direct marketing information 1255 relating to the product that Carla is near (e.g., cereal 1260). In this way, Carla is not receiving anything that is not related to the current situation since the marketing information 1255 is based on who Carla is and where she is in terms of location and environment. After making several purchases, Carla leaves the supermarket. Terminal 605 and/or operator network 625 may recognize that it is no longer receiving and/or not receiving a sufficient amount of RFID information.

Figure 12D:
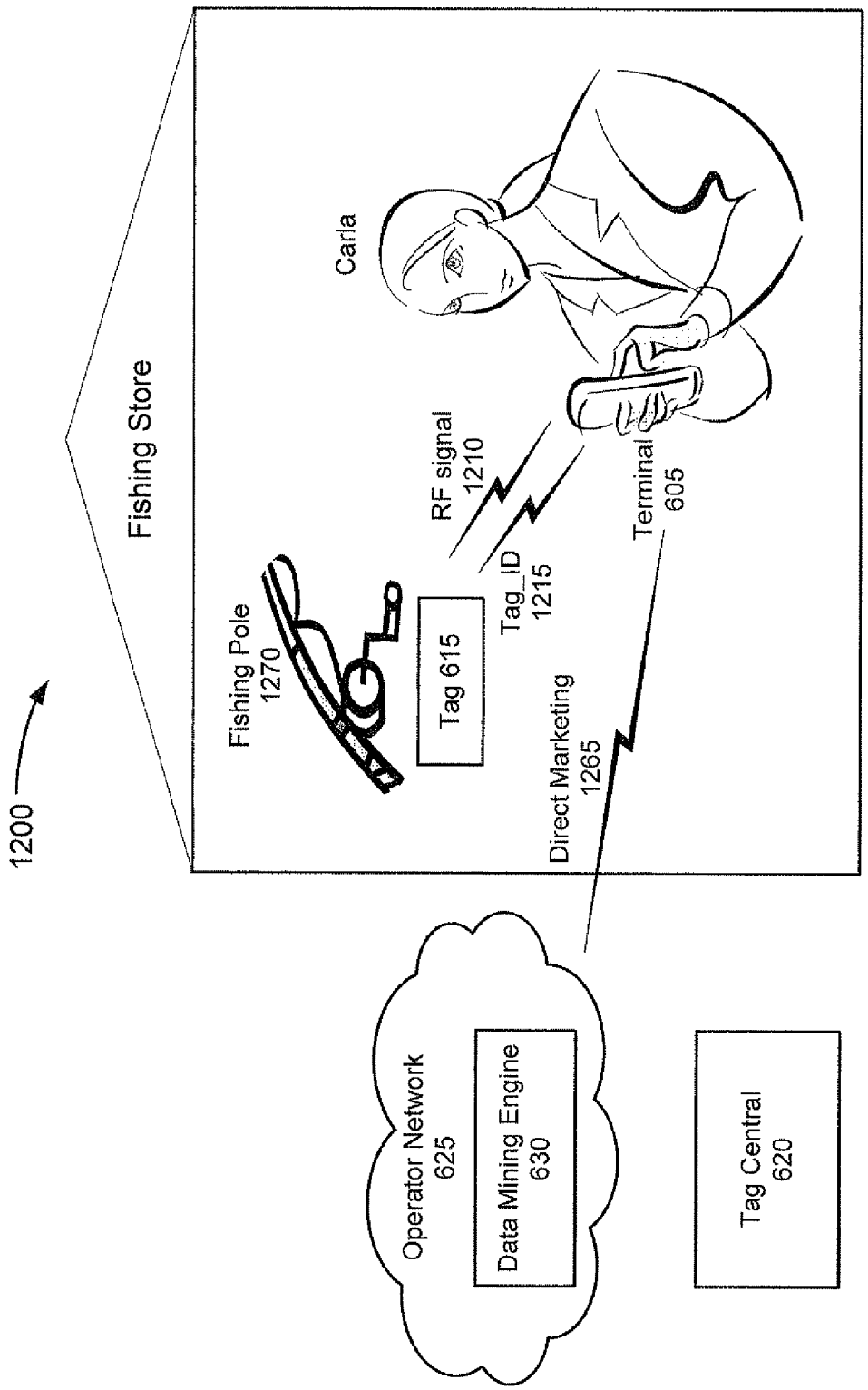

Referring to FIG. 12D, Carla approaches a fishing store to buy some new fishing line and bait for a weekend fishing trip. Similar to the supermarket, as Carla approaches the fishing store, terminal 605 may receive, for example, tag information, that is subsequently communicated to operator network 625. Based on the collected information, operator network 625 may recognize that Carla is now in a fishing store environment. As Carla begins shopping, Carla receives some additional direct marketing information 1265 related to fishing equipment.

Carla, however, has not owned terminal 605 for very long. Therefore, the user profile of Carla is somewhat barren, so terminal 605 may suggest to Carla some uninteresting products (e.g., fishing pole 1270). Carla declines the suggestions, but allows terminal 605 and/or operator network 625 to still keep track of her environment and choices. Carla provides her consent to allow operator network 625 to store environmental information about her. While Carla had the option to decline consent and not permit operator network 625 to collect the environmental information, Carla believes that this process may be useful to her in the future. As a result, a learning algorithm associated with data mining engine 630 may acquire more data.

Carla leaves the fishing store, and terminal 605 may recognize that Carla is no longer in the fishing store. However, reader 840 of terminal 605 is still continuously receiving a transponder_ID from the fishing line that Carla purchased in the fishing store. Based on this information, operator network 625 may conclude that Carla purchased the fishing line at the fishing store, and may add this information to repository 1005. Since the earlier direct marketing information 1265 was rejected by Carla, data mining engine 630 may re-evaluate its previous suggestions and adjust an algorithm to more closely fit Carla's profile even better in the future.

Given that terminal 605 is capable of reading NFC transponders (e.g., RFID transponders), a whole new range of data may become available that may be utilized by different applications, such as data mining engine 630. In this way, the retrieved information may, among other things, provide a basis for inferred knowledge that may be useful to a user, an operator, and/or third parties (e.g., stores, credit card companies, etc.).

Based on the concepts described herein, an operator could establish, for example, clusters, classifications, and/or micro-segments based on the environmental data and/or inferred knowledge. For example, the operator may associate this information to a location map as another dimension (e.g., a fourth dimension) to a location space. Stated differently, a location point may not only include a longitude and a latitude, but also environmental (context) information. That is, location points may have a "profile" indicating, for example, a type of location. Further, the operator may create various location micro-segments by relating and/or associating multiple locations having similar profiles. Similarly, the operator may create various user micro-segments by relating and/or associating multiple users having similar profiles, interests, patterns of shopping, etc., based on, for example, the types of environments these users frequent.

Based on all of the information collected and generated (e.g., inferred knowledge), the operator may offer its users new products and services. In this way, a user may receive more personalized services that can assist the user with daily life decisions.

Other applications and services emerge from the concepts described herein. For example, a user might locate devices in his/her home through tracking it with his/her terminal reader. That is, a user may be able to find out whether a device or item having a tag is located nearby (e.g., in his/her home), or lost somewhere else (e.g. if long-range reading is employed). In one implementation, a user may enter or select, for example, a name (e.g., "my watch" or "my keys"), an identifier (e.g., a number), or an RFID tag number (e.g., downloadable from an operator portal or the Internet) in his/her terminal. The terminal may provide auditory and/or visual cues to the user to locate the lost item. For example, the terminal may provide a visual map indicating that the tag is nearby or not. Additionally, or alternatively, the terminal may emit a sound that changes as the user approaches the lost item.

In other instances, the terminal may warn a user if he/she has forgotten anything when leaving the house. For example, the user may pre-configure that he/she wishes to bring along her wallet, keys, computer, etc. before going to work. In this instance, if those items are not in proximity to the user when the user leaves the house, the terminal may issue an alarm or some type of notification indicating that certain items have been left behind.

In still other instances, blind or sight-disabled users may have a new way to, via the terminal, obtain the same information that users with no sight impairment may receive. This information may include, for example, information on labels (expiration dates, size, color, etc.) that may be stored on the tags and/or downloaded from the tag central. The terminal may communicate this information to a blind or sight-disabled user auditorily and/or tactilely (e.g., a touch screen).

Additionally, a user may be interested in purchasing a particular item but is having problems locating it. In such an instance, the user may set the terminal to provide a notification if the item is every nearby. For example, the user may go on a business trip and pass by a store, the terminal may notify the user that the item is nearby.

In other instances, the operator could inform a user of earlier preferences, what his/her friends liked when they were looking at the same product, statistics relating to the purchase of the product or similar products by other users, and/or other types of recommendations. Further, the user may download more information about a product that he or she may be looking at via, for example, an operator portal or the Internet.

The data mining engine may provide the operator's business department with inferred knowledge based on the environments, the locations, and the users. This information may enable an operator to increase an added value to the operator's products and services that it offers users, understand business flows better, manage costs, etc. In return, a user may receive improved and personalized services.

Still further, partnerships between an operator and businesses may emerge. For example, a business may send to a user advertisements, coupons, etc., that are tailored to a user's demographic, interest, and/or circumstance at the time. The operator may obtain permission from a user to provide this service. Additionally, the terminal may also allow a user to block messages from a business.

The foregoing description of implementations provides illustration, but is not intended to be exhaustive or to limit the implementations to the precise form disclosed. Modifications and variations are possible in light of the above teachings or may be acquired from practice of the teachings.

In addition, while a series of blocks has been described with regard to processes illustrated in FIGS. 11A-11F, the order of the blocks may be modified in other implementations. Further, non-dependent blocks may be performed in parallel. Further one or more blocks may be omitted.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises" or "comprising" when used in the specification is taken to specify the presence of stated features, integers, steps, or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" and "an" are intended to include one or more items. Where only one item is intended, the term "one" or similar language is used. Further, the phrase "based on" is intended to mean "based, at least in part, on" unless explicitly stated otherwise. As used herein, the term "and/or" includes any and all combinations of one or more of the associated list items.

The term "may" is used throughout this application and is intended to be interpreted as "having the potential to," or "being able to," and not in a mandatory sense (e.g., as "must"). The term "and/or" is intended to be interpreted to include any and all combinations of one or more of the associated list items.

What is claimed is:

1. A mobile device comprising:
a memory configured to store instructions; and a processor configured to execute the instructions in the memory to:
receive one or more consumer product identifiers from one or more near field communication transponders;
provide a timestamp for each of the one or more consumer product identifiers, where the timestamp provides information as to when the one or more near field communication transponders was within communication range of the mobile device;
determine whether user consent exists for transmitting the one or more consumer product identifiers to a network for data mining purposes;
store one of the one or more consumer product identifiers, where the one of the one or more consumer product identifiers corresponds to a product owned by the user;
alert the user if when the one of the one or more consumer product identifiers becomes located beyond communication range of the mobile device;
determine whether the one or more consumer product identifiers meet a threshold value, where the threshold value equates to a number of product identifiers that allow the network to generate environmental data,
associated with the mobile device, based on the one or more consumer product identifiers; and
transmit, to the network, the one or more consumer product identifiers for data mining purposes when user consent exists.

2. The mobile device of claim 1, where the processor is further configured to execute instructions in the memory to:
obtain location information corresponding to a location of the mobile device when the one or more near field communication transponders was within communication range of the mobile device; and
transmit the location information to the network for the data mining purposes.

3. The mobile device of claim 1, where the processor is further configured to execute instructions in the memory to:
selectively transmit the one or more consumer product identifiers responsive to determine whether the at least one of the one or more consumer product identifiers was previously transmitted to the network.

4. The mobile device of claim 1, where the processor is further configured to execute instructions in the memory to:
obtain product type information corresponding to the one or more consumer product identifiers.

5. The mobile device of claim 1, where the processor is further configured to execute instructions in the memory to:
provide a user identifier to the network for data mining purposes.

6. The mobile device of claim 1, where the one or more consumer product identifiers correspond to one or more radio frequency identification tags.

* * * * *